US012559635B2

(12) United States Patent (10) Patent No.: US 12,559,635 B2
Woodworth et al. (45) Date of Patent: Feb. 24, 2026

(54) COATED SUBSTRATES AND METHODS OF PREPARING THE SAME

(71) Applicant: PPG Industries Ohio, Inc., Cleveland, OH (US)

(72) Inventors: Brian E. Woodworth, Glenshaw, PA (US); John R. Schneider, Allison Park, PA (US); Anthony M. Chasser, Greensburg, PA (US); Liang Ma, Allison Park, PA (US); Calum H. Munro, Gibsonia, PA (US); Marvin M. Pollum, Jr., Pittsburgh, PA (US); Maria S. French, Berkshire (GB); Allison G. Condie, Valencia, PA (US); Holli A. Gonder-Jones, Akron, OH (US); Daniel K. Dei, Pittsburgh, PA (US); Christopher Apanius, Moreland Hills, OH (US); Cassandra Noelle Bancroft, Fairview Park, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 723 days.

(21) Appl. No.: 17/905,023

(22) PCT Filed: Feb. 26, 2021

(86) PCT No.: PCT/US2021/020030
§ 371 (c)(1),
(2) Date: Aug. 25, 2022

(87) PCT Pub. No.: WO2021/174086
PCT Pub. Date: Sep. 2, 2021

(65) Prior Publication Data
US 2023/0167311 A1 Jun. 1, 2023

Related U.S. Application Data

(60) Provisional application No. 62/981,759, filed on Feb. 26, 2020.

(51) Int. Cl.
| | |
|---|---|
| *C09D 7/00* | (2018.01) |
| *C09D 7/40* | (2018.01) |
| *C09D 7/43* | (2018.01) |
| *C09D 7/45* | (2018.01) |
| *C09D 7/61* | (2018.01) |
| *C09D 133/06* | (2006.01) |
| *C09D 163/00* | (2006.01) |

(52) U.S. Cl.
CPC ............... *C09D 7/61* (2018.01); *C09D 7/43* (2018.01); *C09D 7/45* (2018.01); *C09D 7/66* (2018.01); *C09D 133/06* (2013.01); *C09D 163/00* (2013.01)

(58) Field of Classification Search
CPC ... C09D 7/61; C09D 7/43; C09D 7/45; C09D 7/66; C09D 133/06; C09D 163/00
USPC ..................................................... 106/287.24
See application file for complete search history.

(56) References Cited

U.S. PATENT DOCUMENTS

| | | | | |
|---|---|---|---|---|
| 2009/0104364 A1* | 4/2009 | Millero, Jr. | ............ | C09D 5/084 524/556 |
| 2011/0177346 A1* | 7/2011 | Silvernail | ................ | B05D 7/51 427/202 |

FOREIGN PATENT DOCUMENTS

| | | | | |
|---|---|---|---|---|
| WO | 2000068459 A1 | 11/2000 | | |
| WO | 2004067190 A2 | 8/2004 | | |
| WO | 2019126527 A1 | 6/2019 | | |
| WO | WO-2020046937 A1 * | 3/2020 | ............... | C09D 5/03 |

OTHER PUBLICATIONS

International Search Report and Written Opinion received for PCT Application Serial No. PCT/US2021/020030 dated Jun. 30, 2021, 10 pages.
Dagdag et al., "Phosphorous-based epoxy resin composition as an effective anticorrosive coating for steel", International Journal of Industrial Chemistry, vol. 9, No. 3, Sep. 20, 2018, pp. 231-240.

* cited by examiner

*Primary Examiner* — James E McDonough

(57) ABSTRACT

The present invention relates to a substrate having (a) a first material applied to at least a portion of the substrate, and (b) a coating layer deposited from a powder coating composition including a film-forming resin, and optionally a thermally conductive, electrically insulative filler material and/or a crosslinker that is reactive with the film-forming resin, in direct contact with at least a portion of the substrate to which the first material has been applied. The first material is (i) a catalyst that catalyzes cure of the powder coating composition, (ii) a component reactive with the film-forming resin and/or the crosslinker of the powder coating composition, and/or (iii) a rheology modifier.

25 Claims, No Drawings

COATED SUBSTRATES AND METHODS OF PREPARING THE SAME

FIELD OF THE INVENTION

The present invention relates to substrates and methods for treating substrates, sealing surfaces of substrates, decreasing sag resistance, improving adhesion, improving edge coverage, improving thermal conductivity, and/or dielectric properties.

BACKGROUND OF THE INVENTION

Coatings are applied to substrates to provide numerous properties including protective properties, decorative properties, and the like. Typically, these coatings are applied across the entire surface of the substrates including the edges and corners. However, the compositions that form these coatings often flow over the edges and corners resulting in low film build around these areas. As a result, the coatings pull away from the edges and corners of the substrates, so the properties provided by these coatings are not obtained or are diminished at the edges and corners.

In addition, substrates, such as metal substrates including metal electrical components and batteries, are often protected with a high dielectric strength material to provide insulating properties. For example, components have been coated with a dielectric tapes and coatings to provide insulating properties. While dielectric tapes and coatings can provide insulating properties, they can be difficult to apply uniformly to substrates. In addition, it can be difficult to obtain good insulating properties at low coating film thicknesses. In addition, battery components can produce heat during use, and insulating tapes and coatings often have difficulty dissipating such heat by conducting it away from the underlying substrate. Thus, it is desirable to develop improved dielectric coatings that provide good electrical insulation.

Thus, it is desirable to provide coated substrates with improved dielectric strength and improved coating coverage over the edges and corners.

SUMMARY OF THE INVENTION

The present invention relates to a substrate comprising (a) a first material applied to at least a portion of the substrate; and (b) a continuous film deposited from a curable powder coating composition comprising a film-forming resin having functional groups, a thermally conductive, electrically insulative filler material, and optionally a crosslinker that is reactive with the functional groups of the film-forming resin, in contact with at least a portion of the substrate to which the first material has been applied, wherein the first material is (i) a catalyst that catalyzes cure of the powder coating composition, (ii) a component reactive with the film-forming resin and/or the crosslinker of the powder coating composition, and/or (iii) a rheology modifier.

The present invention is also directed to a substrate comprising (a) a first material applied to at least a portion of the substrate; and (b) a continuous film deposited from a curable powder coating composition comprising a film-forming resin having functional groups, and optionally a crosslinker that is reactive with the functional groups of the film-forming resin, in contact with at least a portion of the substrate to which the first material has been applied, wherein the first material is (i) a catalyst that catalyzes cure of the powder coating composition, (ii) a component reactive with the film-forming resin and/or the crosslinker of the powder coating composition, and/or (iii) a rheology modifier; wherein the continuous film comprises a binder comprising: (a) an epoxy functional polymer; (b) a poly-carboxylic acid functional polyester polymer reactive with the epoxy functional polymer and which comprises an acid value of less than 100 mg KOH/g; and (c) a poly-carboxylic acid functional (meth)acrylate polymer reactive with the epoxy functional polymer.

The present invention is further directed to a method for treating a substrate, sealing a surface of a substrate, decreasing sag resistance, improving adhesion, and/or improving edge coverage (a) contacting at least a portion of the substrate with a first material; (b) directly contacting at least a portion of the substrate in contact with the first material with a powder coating composition comprising a film-forming resin having functional groups, a thermally conductive, electrically insulative material, and optionally a crosslinker that is reactive with the functional groups of the film-forming resin, and (c) liquidizing the powder coating composition to form a continuous film of the powder coating composition on the substrate, wherein the first material is (i) a catalyst that catalyzes cure of the powder coating composition, (ii) a component reactive with the film-forming resin and/or the crosslinker of the powder coating composition, and/or (iii) a rheology modifier.

Moreover, the present invention relates to a method for treating a substrate, sealing a surface of a substrate, decreasing sag resistance, improving adhesion, and/or improving edge coverage comprising: (a) contacting at least a portion of the substrate with a first material; (b) directly contacting at least a portion of the substrate in contact with the first material with a powder coating composition comprising a film-forming resin having functional groups, and optionally a crosslinker that is reactive with the functional groups of the film-forming resin, wherein the powder coating composition comprises a binder comprising: (a) an epoxy functional polymer; (b) a poly-carboxylic acid functional polyester polymer reactive with the epoxy functional polymer and which comprises an acid value of less than 100 mg KOH/g; and (c) a poly-carboxylic acid functional (meth)acrylate polymer reactive with the epoxy functional polymer; and (c) liquidizing the powder coating composition to form a continuous film of the powder coating composition on the substrate, wherein the first material is (i) a catalyst that catalyzes cure of the powder coating composition, (ii) a component reactive with the film-forming resin and/or the crosslinker of the powder coating composition, and/or (iii) a rheology modifier.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" first material, "a" coating composition, and the like refer to one or more of any of these items.

As previously described, the present invention relates to a substrate comprising: (a) a first material applied to at least a portion of the substrate; and (b) a coating layer deposited from a powder coating composition comprising a film-forming resin, and optionally an electrically insulative filler and/or a crosslinker reactive with the film-forming resin, that is in direct contact with at least a portion of the substrate to which the first material has been applied. That is, the powder coating composition is applied directly to at least a portion of the substrate to which the first material is applied before application of any other intermediate layers. As used herein, a "powder coating composition" refers to a coating composition embodied in solid particulate form as opposed to liquid form.

It is appreciated that the coating layer deposited from the powder coating composition is formed after liquidizing (i.e., melting) the powder coating composition on the substrate to which the first material has been applied. In accordance with the present invention, the interfacial flow of the liquidized powder coating composition in contact with at least a portion of the substrate to which the first material has been applied is lower than the interfacial flow of the same powder composition liquidized under the same conditions that is in contact with an identical substrate with the exception that no first material has been applied or with a portion of the same substrate to which the first material has not been applied. The "interfacial flow" refers to the flow of the liquidized powder coating composition at an interface of the first material and the liquidized powder coating composition. The viscosity of the liquidized powder coating composition can also be higher than the viscosity of the same powder coating composition liquidized under the same conditions without contact to the first material.

The first material of the present invention can be selected to interact with the desired powder coating composition. The powder coating composition is typically a curable powder coating composition that comprises a binder. As used herein, the terms "curable", "cure", and the like, as used in connection with a powder coating composition, means that at least a portion of the components that make up the powder coating composition are polymerizable and/or crosslinkable including self-crosslinkable polymers.

The curable powder coating composition of the present invention can be cured with heat, increased or reduced pressure, chemically such as with moisture, or with other means such as actinic radiation, and combinations thereof.

The term "actinic radiation" refers to electromagnetic radiation that can initiate chemical reactions. Actinic radiation includes, but is not limited to, visible light, ultraviolet (UV) light, infrared radiation, X-ray, and gamma radiation.

Further, a "binder" refers to a constituent material that typically holds all coating composition components together upon cure. The binder comprises one or more film-forming resins that can be used to form the coating layer. As used herein, a "film-forming resin" refers to a resin that can form a self-supporting continuous film on at least a horizontal surface of a substrate upon removal of any diluents or carriers present in the composition and/or upon curing. The term "resin" is used interchangeably with "polymer," and the term polymer refers to oligomers, homopolymers (e.g., prepared from a single monomer species), copolymers (e.g., prepared from at least two monomer species), terpolymers (e.g., prepared from at least three monomer species), and graft polymers.

The powder coating compositions used with the present invention can include any of a variety of thermosetting powder coating compositions known in the art. As used herein, the term "thermosetting" refers to compositions that "set" irreversibly upon curing or crosslinking, wherein polymer chains of polymeric components are joined together by covalent bonds. This property is usually associated with a cross-linking reaction of the composition constituents often induced, for example, by heat or radiation. Once cured, a thermosetting resin will not melt upon the application of heat and is insoluble in solvents.

The powder coating compositions used with the present invention can also include thermoplastic powder coating compositions. As used herein, the term "thermoplastic" refers to compositions that include polymeric components that are not joined by covalent bonds after baking to form a coating and, thereby, can undergo liquid flow upon heating without crosslinking.

Non-limiting examples of suitable film-forming resins that form at least a portion of the binder of the powder coating composition include (meth)acrylate resins, polyurethanes, polyesters, polyamides, polyethers, polysiloxanes, epoxy resins, vinyl resins, copolymers thereof, and combinations thereof. As used herein, "(meth)acrylate" and like terms refers both to the acrylate and the corresponding methacrylate. Further, the film-forming resins can have any of a variety of functional groups including, but not limited to, carboxylic acid groups, amine groups, epoxide groups, hydroxyl groups, thiol groups, carbamate groups, amide groups, urea groups, isocyanate groups (including blocked isocyanate groups), ethylenically unsaturated groups, and combinations thereof. As used herein, "ethylenically unsaturated" refers to a group having at least one carbon-carbon double bond. Non-limiting examples of ethylenically unsaturated groups include, but are not limited to, (meth) acrylate groups, vinyl groups, and combinations thereof.

Thermosetting coating compositions typically comprise a crosslinker that may be selected from any of the crosslinkers known in the art to react with the functionality of one or more film-forming resins used in the powder coating composition. As used herein, the term "crosslinker" refers to a molecule comprising two or more functional groups that are reactive with other functional groups and that is capable of linking two or more monomers or polymers through chemical bonds. Accordingly, the powder coating composition may optionally comprise a crosslinker. Alternatively, the film-forming resins that form the binder of the powder coating composition can have functional groups that are reactive with themselves; in this manner, such resins are self-crosslinking.

Non-limiting examples of crosslinkers include phenolic resins, amino resins, epoxy resins, triglycidyl isocyanurate, beta-hydroxy (alkyl) amides, alkylated carbamates, (meth) acrylates, poly carboxylic acids with cyclic amidine, o-tolyl biguanide, isocyanates, blocked isocyanates, polyacids, anhydrides, organometallic acid-functional materials, polyamines, polyamides, aminoplasts, carbodiimides, oxazolines, and combinations thereof As mentioned above, the binder of the powder coating composition may comprise one or more film-forming resins and one or more crosslinkers. A binder that comprises two or more film-forming resins may be referred to as a hybrid binder. For example, the film-forming resin of the binder may comprise, consist essentially of, or consist of at least two of (meth)acrylate resins, polyurethanes, polyesters, polyamides, polyethers, polysiloxanes, epoxy resins, vinyl resins, or copolymers thereof. In addition, the binder may comprise a crosslinker comprising, consisting essentially of, or consisting of one of or a combination of phenolic resins, amino resins, epoxy resins, triglycidyl isocyanurate, beta-hydroxy (alkyl) amides, alkylated carbamates, (meth)acrylates, salts of poly carboxylic acids with cyclic amidine, o-tolyl biguanide isocyanates, blocked isocyanates, polyacids, anhydrides, organometallic acid-functional materials, polyamines, polyamides, aminoplasts, carbodiimides, or oxazolines.

Alternatively, the binder of the powder coating composition may comprise, consist essentially of, or consist of a single film-forming resin. For example, the film-forming resin of the binder may comprise, consist essentially of, or consist of one of (meth)acrylate resins, polyurethanes, polyesters, polyamides, polyethers, polysiloxanes, epoxy resins, vinyl resins, or copolymers thereof, without a second resin present that is different than the first resin. In addition, the binder may comprise a crosslinker comprising, consisting essentially of, or consisting of one of or a combination of phenolic resins, amino resins, epoxy resins, triglycidyl isocyanurate, beta-hydroxy (alkyl) amides, alkylated carbamates, (meth)acrylates, isocyanates, blocked isocyanates, polyacids, anhydrides, organometallic acid-functional materials, polyamines, polyamides, aminoplasts, carbodiimides, or oxazolines.

The binder of the powder coating composition may comprise, consist essentially of, or consist of film-forming resins having the same reactive functionality. For example, the film-forming resin may comprise two or more epoxy functional film-forming resins.

The film-forming resin may be present in the binder in an amount of at least 10% by weight, such as at least 20% by weight, at least 30% by weight, or at least 40% by weight, based on the total weight of the binder. The film-forming resin can be present in the binder in an amount of up to 97% by weight, such as up to 80% by weight, such as up to 60% by weight, such as up to 50% by weight, based on the total weight of the binder. The film-forming resin may be present in the binder an amount from 10% to 97% by weight, such as 10% to 80% by weight, such as 10% to 60% by weight, such as 10% to 50% by weight, such as 20% to 97% by weight, such as 20% to 80% by weight, such as 20% to 60% by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder.

The film-forming resin may comprise a single film-forming resin comprising may comprise, consist essentially of, or consist of one of (meth)acrylate resins, polyurethanes, polyesters, polyamides, polyethers, polysiloxanes, epoxy resins, vinyl resins, or copolymers thereof in an amount of at least 20 weight %, at least 30 weight %, or at least 40 weight % of the powder coating composition, based on the total weight of the binder. The film-forming resin may comprise a single film-forming resin comprising may comprise, consist essentially of, or consist of one of (meth) acrylate resins, polyurethanes, polyesters, polyamides, polyethers, polysiloxanes, epoxy resins, vinyl resins, or copolymers thereof in an amount of up to 97% by weight, such as up to 80% by weight, such as up to 60 weight %, such as up to 50 weight % of the powder coating composition, based on the total weight of the binder. The film-forming resin may comprise a single film-forming resin comprising may comprise, consist essentially of, or consist of one of (meth)acrylate resins, polyurethanes, polyesters, polyamides, polyethers, polysiloxanes, epoxy resins, vinyl resins, or copolymers thereof in an amount of from 20% to 97% by weight, such as 20% to 80% by weight, such as 20% to 605 by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder.

The crosslinker may be present in the binder an amount of at least 3% by weight, such as at least 10% by weight, such as at least 20% by weight, such as at least 30% by weight, such as at least 40% by weight, based on the total weight of the binder. The crosslinker may be present in the binder an amount of up to 70 weight %, such as up to 60 weight %, such as up to 50 weight %, such as up to 40% by weight, based on the total weight of the binder. The crosslinker may be present in the binder an amount of from 3% to 70% by weight, such as 3% to 60% by weight, such as 3% to 50% by weight, such as 3% to 40% by weight, such as 10% to 70% by weight, such as 10% to 60% by weight, such as 10% to 50% by weight, such as 10% to 40% by weight, such as 30% to 70% by weight, such as 30% to 60% by weight, such as 30% to 50% by weight, such as 30% to 40% by weight, such as 40% to 70% by weight, such as 40% to 60% by weight, such as 40% to 50% by weight, based on the total weight of the binder.

The powder coating compositions can also be substantially free, essentially free, or completely free of any of the previously described film-forming resins and/or crosslinkers. For example, the powder coating composition can be substantially free, essentially free, or completely free of a hydroxyl functional film-forming resin and/or an isocyanate functional crosslinker. The term "substantially free" as used in this context means the powder coating composition contains less than 1000 parts per million (ppm), "essentially free" means less than 100 ppm, and "completely free" means less than 20 parts per billion (ppb) of a certain film-forming resin and/or crosslinker such as a hydroxyl functional film-forming resin and/or an isocyanate functional crosslinker, based on the total weight of the powder coating composition.

A non-limiting example of a powder coating composition for preparing the dielectric coating comprises a binder comprising: (a) an epoxy functional polymer; (b) a polycarboxylic acid functional polyester polymer reactive with the epoxy functional polymer and which comprises an acid value of less than 100 mg KOH/g; and (c) a poly-carboxylic acid functional (meth)acrylate polymer reactive with the epoxy functional polymer. It is appreciated that the epoxy functional polymer, poly-carboxylic acid functional polyester polymer, and poly-carboxylic acid functional (meth)acrylate polymer can react to form a hydroxyl functional reaction product.

As used herein, a "poly-carboxylic acid functional polymer" refers to a polymer having two or more carboxylic acid functional groups. The poly-carboxylic acid functional polyester polymer used in the powder coating composition of the present invention can have an acid value of less than 100 mg KOH/g or less than 80 mg KOH/g. The poly-carboxylic acid functional polyester polymer can further have an acid value of at least 60 mg KOH/g. The poly-carboxylic acid functional polyester polymer can also have, for example, an acid value of from 60 mg KOH/g to 100 mg KOH/g, or from 60 mg KOH/g to 80 mg KOH/g. The poly-carboxylic acid functional polyester polymer can be formed from various materials such as poly(ethylene terephthalate) for example.

The poly-carboxylic acid functional polyester polymer can comprise at least 20 weight %, at least 25 weight %, at least 30 weight %, at least 35 weight %, or at least 40 weight % of the powder coating composition, based on the total solids weight of the powder coating composition. The poly-carboxylic acid functional polyester polymer can comprise up to 97 weight % or up to 60 weight % or up to 50 weight % of the powder coating composition, based on the total solids weight of the powder coating composition. The poly-carboxylic acid functional polyester polymer can also comprise an amount within a range such as from 20 to 97 weight % or from 20 to 60 weight % or from 30 to 50 weight % of the powder coating composition, based on the total solids weight of the powder coating composition.

As indicated, the powder coating composition also comprises a poly-carboxylic acid functional (meth)acrylate polymer. The poly-carboxylic acid functional (meth)acrylate polymer can comprise at least 0.05 weight %, at least 0.1 weight %, at least 0.5 weight %, at least 1 weight %, or at least 2 weight % of the powder coating composition, based on the total solids weight of the powder coating composition. The poly-carboxylic acid functional (meth)acrylate polymer can comprise up to 10 weight %, up to 5 weight %, or up to 3 weight % of the powder coating composition, based on the total solids weight of the powder coating composition. The poly-carboxylic acid functional (meth)acrylate polymer can also comprise an amount within a range such as from 0.05 to 10 weight %, or from 0.1 to 5 weight %, or from 1 to 3 weight % of the powder coating composition, based on the total solids weight of the powder coating composition.

The poly-carboxylic acid functional polyester polymer and the poly-carboxylic acid functional (meth)acrylate polymer can be combined in the powder coating composition to provide a desired weight ratio. For example, the poly-carboxylic acid functional polyester polymer and the poly-carboxylic acid functional (meth)acrylate polymer can be combined in the powder coating composition to provide a weight ratio of the poly-carboxylic acid functional polyester polymer to the poly-carboxylic acid functional (meth)acrylate polymer of 1:1 or greater, or 5:1 or greater, or 10:1 or greater, or 15:1 or greater, or 20:1 or greater.

The powder coating composition can also include additional carboxylic acid functional polymers including, but not limited to, carboxylic acid functional polyurethane polymers, polyamide polymers, polyether polymers, polysiloxane polymers, vinyl resins, copolymers thereof, and combinations thereof. Further, any of the previously described carboxylic acid functional polymers can have any of a variety of additional functional groups including, but not limited to, amine groups, hydroxyl groups, thiol groups, carbamate groups, amide groups, urea groups, and combinations thereof. Alternatively, the powder coating composition of the present invention can be free of such additional poly-carboxylic acid functional polymers.

The total amount of carboxylic acid functional polymers can comprise at least 20 weight %, at least 30 weight %, or at least 40 weight % of the powder coating composition, based on the total solids weight of the powder coating composition. The total amount of carboxylic acid functional polymers can comprise up to 70 weight %, up to 60 weight %, or up to 50 weight % of the powder coating composition, based on the total solids weight of the powder coating composition. The total amount of carboxylic acid functional polymers can also comprise an amount within a range such as from 20 to 70 weight %, or from 30 to 60 weight %, or from 40 to 50 weight % of the powder coating composition, based on the total solids weight of the powder coating composition.

The carboxylic acid functional polymers can also be formed from recycled materials. For example, the powder coating composition of the present invention can comprise a poly-carboxylic acid functional polyester prepared from at least one recycled material. A non-limiting example of a recycled material that can be used to form the poly-carboxylic acid functional polyester is recycled poly(ethylene terephthalate).

As previously described, the exemplary powder coating composition of the present invention also comprises an epoxy functional polymer that is reactive with at least the poly-carboxylic acid functional polyester polymer and the poly-carboxylic acid functional (meth)acrylate polymer. It is appreciated that the epoxy functional polymer comprises two or more epoxy functional groups and acts as a cross-linker when reacted with the carboxylic acid functional polymers. Non-limiting examples of suitable epoxy functional polymers include, but are not limited to, diglycidyl ethers of bisphenol A, polyglycidyl ethers of polyhydric alcohols, polyglycidyl esters of polycarboxylic acids, and combinations thereof. Non-limiting examples of suitable epoxy resins are also commercially available from NanYa Plastics under the trade name NPES-903, and from Hexion under the trade names EPON™ 2002 and EPON 2004™.

The epoxy functional polymer can have an equivalent weight of at least 200 or at least 500 or at least 700. The epoxy functional polymer can also comprise an equivalent weight of up to 1000 or up to 5100. The epoxy functional polymer can comprise an equivalent weight within the range of 200 to 5100 or from 200 to 1000 or from 500 to 5100 or from 500 to 1000 or from 700 to 5100 or from 700 to 1000. As used herein, "equivalent weight" refers to the average weight molecular weight of a resin divided by the number of functional groups. As such, the equivalent weight of the epoxy functional polymer is determined by dividing the average weight molecular weight of the epoxy resin by the total number of epoxide groups and any other optional functional groups that are not an epoxide. Further, the average weight molecular weight is determined by gel permeation chromatography relative to linear polystyrene standards of 800 to 900,000 Daltons as measured with a Waters 2695 separation module with a Waters 410 differential refractometer (RI detector). Tetrahydrofuran (THF) is used as the eluent at a flow rate of 1 ml min-1, and two PLgel Mixed-C (300×7.5 mm) columns is used for separation.

It is appreciated that the epoxy functional polymer can comprise one or multiple types of epoxy functional polymers. When multiple epoxy functional polymers are used, the multiple epoxy functional polymers can have the same or different equivalent weights. For instance, a first epoxy functional polymer can have an equivalent weight that is greater than an equivalent weight of a second epoxy functional polymer. The epoxy functional polymers can also include additional functional groups besides the epoxy functional groups including, but not limited to, any of the previously described functional groups. Alternatively, the epoxy functional polymer can be free of any one, or all, of the previously described functional groups besides the epoxy functional groups.

The epoxy functional polymer can comprise at least 10 weight %, at least 20 weight %, at least 30 weight %, or at least 40 weight % of the powder coating composition, based on the total solids weight of the powder coating composition. The epoxy functional polymer can comprise up to 95 weight % or up to 60 weight % or up to 50 weight % of the powder coating composition, based on the total solids weight of the coating composition. The epoxy functional polymer can also comprise an amount within a range such as from 10 to 95 weight %, or from 20 to 60 weight %, or from 30 to 50 weight %, or from 40 to 50 weight % of the powder coating composition, based on the total solids weight of the powder coating composition.

The poly-carboxylic acid functional polyester polymer and the epoxy functional polymer can also be combined in the powder coating composition to provide a desired weight ratio. For example, the poly-carboxylic acid functional polyester polymer and the epoxy functional polymer can be combined in the powder coating composition to provide a weight ratio of the poly-carboxylic acid functional polyester polymer to the epoxy functional polymer of 0.2:1 to 1:1, or from 0.5:1 to 1:0.5, or from 0.8:1 to 1:0.8, or from 0.9:1 to 1:0.9, or from 0.95:1 to 1:0.95, or at a ratio of 1:1.

The carboxylic acid functional polymers and the epoxy functional polymer of the powder coating composition are reacted to form a reaction product comprising hydroxyl functional groups. The reaction product can comprise one or multiple hydroxyl groups. For example, the reaction product can comprise multiple pendant hydroxyl groups and, optionally, terminal hydroxyl groups.

The powder coating composition of the present invention can also comprise, as discussed above, an isocyanate functional crosslinker that is reactive with the previously described reaction product comprising hydroxyl functional groups. The isocyanate crosslinker can provide additional properties including, for example, a higher crosslink density for increased chemical and abrasion resistance.

The isocyanate functional crosslinker can include various types of polyisocyanates. Polyisocyanates that can be used include aliphatic and aromatic diisocyanates as well as higher functional polyisocyanates. Non-limiting examples of suitable polyisocyanates include isophorone diisocyanate (IPDI), dicyclohexylmethane 4,4'-diisocyanate (H12MDI), cyclohexyl diisocyanate (CFIDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexam ethylene diisocyanate or FIDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenyl ene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

The isocyanate crosslinker can comprise a blocked isocyanate functional crosslinker. A "blocked isocyanate" refers to a compound with isocyanate functional groups that have been reacted with a blocking agent and which prevents the isocyanate functionality from reacting until the blocking agent is removed upon exposure to an external stimulus such as heat. Non-limiting examples of blocking agents include phenols, pyridinols, thiophenols, methylethylketoxime, amides, caprolactam, imidazoles, and pyrazoles. The isocyanate can also include a uretdione isocyanate such as a uretdione internally blocked isocyanate adduct.

The isocyanate functional crosslinker can comprise at least 0.1 weight %, at least 1 weight %, or at least 3 weight % of the powder coating composition, based on the total solids weight of the powder coating composition. The isocyanate functional crosslinker can comprise up to 50 weight %, up to 30 weight %, up to 20 weight %, up to 10 weight %, up to 8 weight %, or up to 5 weight % of the powder coating composition, based on the total solids weight of the powder coating composition. The isocyanate functional crosslinker can also comprise an amount within a range such as from 0.1 to 50 weight %, or from 0.1 to 30 weight %, or from 0.1 to 20 weight %, or from 0.1 to 10 weight %, or from 0.1 to 8 weight %, or from 0.1 to 5 weight %, or from 1 to 50 weight %, or from 1 to 30 weight %, or from 1 to 20 weight %, or from 1 to 10 weight %, or from 1 to 8 weight %, or from 1 to 5 weight %, or from 3 to 50 weight %, or from 3 to 30 weight %, or from 3 to 20 weight %, or from 3 to 10 weight %, or from 3 to 8 weight %, or from 3 to 5 weight %, based on the total solids weight of the powder coating composition.

A non-limiting example of a binder of the powder coating composition is a binder comprising, consisting essentially of, or consisting of (a) an epoxy functional polymer; and (b) a crosslinker. The epoxy functional polymer may be present in an amount of at least 10% by weight, such as at least 20% by weight, at least 30% by weight, or at least 40% by weight, based on the total weight of the binder. The epoxy functional polymer may be present in the binder in an amount of up to 97% by weight, such as up to 80% by weight, such as up to 60% by weight, such as up to 50% by weight, based on the total weight of the binder. The epoxy functional polymer may be present in the binder an amount from 10% to 97% by weight, such as 10% to 80% by weight, such as 10% to 60% by weight, such as 10% to 50% by weight, such as 20% to 97% by weight, such as 20% to 80% by weight, such as 20% to 60% by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder. The crosslinker may be present in the binder an amount of at least 3% by weight, such as at least 10% by weight, such as at least 20% by weight, such as at least 30% by weight, such as at least 40% by weight, based on the total weight of the binder. The crosslinker may be present in the binder an amount of up to 70 weight %, such as up to 60 weight %, such as up to 50 weight %, such as up to 40% by weight, based on the total weight of the binder. The crosslinker may be present in the binder an amount of from 3% to 70% by weight, such as 3% to 60% by weight, such as 3% to 50% by weight, such as 3% to 40% by weight, such as 10% to 70% by weight, such as 10% to 60% by weight, such as 10% to 50% by weight, such as 10% to 40% by weight, such as 30% to 70% by weight, such as 30% to 60% by weight, such as 30% to 50% by weight, such as 30% to 40% by weight, such as 40% to 70% by weight, such as 40% to 60% by weight, such as 40% to 50% by weight, based on the total weight of the binder.

A non-limiting example of a binder of the powder coating composition is a binder comprising, consisting essentially of, or consisting of (a) polyester resin; and (b) a crosslinker. The polyester resin may be present in an amount of at least 10% by weight, such as at least 20% by weight, at least 30% by weight, or at least 40% by weight, based on the total weight of the binder. The polyester resin may be present in the binder in an amount of up to 97% by weight, such as up to 80% by weight, such as up to 60% by weight, such as up to 50% by weight, based on the total weight of the binder. The polyester resin may be present in the binder an amount from 10% to 97% by weight, such as 10% to 80% by weight, such as 10% to 60% by weight, such as 10% to 50% by weight, such as 20% to 97% by weight, such as 20% to 80% by weight, such as 20% to 60% by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder. The crosslinker may be present in the binder an amount of at least 3% by weight, such as at least 10% by weight, such as at least 20% by weight, such as at least 30% by weight, such as at least 40% by weight, based on the total weight of the binder. The crosslinker may be present in the binder an amount of up to 70 weight %, such as up to 60 weight %, such as up to 50 weight %, such as up to 40% by weight, based on the total weight of the binder. The crosslinker may be present in the binder an amount of from 3% to 70% by weight, such as 3% to 60% by weight, such as 3% to 50% by weight, such as 3% to 40% by weight, such as 10% to 70% by weight, such as 10% to 60% by weight, such as 10% to 50% by weight, such as 10% to 40% by weight, such as 30% to 70% by weight, such as 30% to 60% by weight, such as 30% to 50% by weight, such as 30% to 40% by weight, such as 40% to 70% by weight, such as 40% to 60% by weight, such as 40% to 50% by weight, based on the total weight of the binder.

A non-limiting example of a binder of the powder coating composition is a binder comprising, consisting essentially of, or consisting of (a) a polyester resin; and (b) a crosslinker comprising a polyisocyanate. The polyester resin may be present in an amount of at least 10% by weight, such as at least 20% by weight, at least 30% by weight, or at least 40% by weight, based on the total weight of the binder. The polyester resin may be present in the binder in an amount of up to 97% by weight, such as up to 80% by weight, such as up to 60% by weight, such as up to 50% by weight, based on the total weight of the binder. The polyester resin may be present in the binder an amount from 10% to 97% by weight, such as 10% to 80% by weight, such as 10% to 60% by weight, such as 10% to 50% by weight, such as 20% to 97% by weight, such as 20% to 80% by weight, such as 20% to 60% by weight, such as 20% to 50% by weight, such as 30% to 97% by weight, such as 30% to 80% by weight, such as 30% to 60% by weight, such as 30% to 50% by weight, such as 40% to 97% by weight, such as 40% to 80% by weight, such as 40% to 60% by weight, such as 40% to 50% by weight, based on the total weight of the binder. The polyisocyanate may be present in the binder an amount of at least 3% by weight, such as at least 10% by weight, such as at least 20% by weight, such as at least 30% by weight, such as at least 40% by weight, based on the total weight of the binder. The polyisocyanate may be present in the binder an amount of up to 70 weight %, such as up to 60 weight %, such as up to 50 weight %, such as up to 40% by weight, based on the total weight of the binder. The polyisocyanate may be present in the binder an amount of from 3% to 70% by weight, such as 3% to 60% by weight, such as 3% to 50% by weight, such as 3% to 40% by weight, such as 10% to 70% by weight, such as 10% to 60% by weight, such as 10% to 50% by weight, such as 10% to 40% by weight, such as 30% to 70% by weight, such as 30% to 60% by weight, such as 30% to 50% by weight, such as 30% to 40% by weight, such as 40% to 70% by weight, such as 40% to 60% by weight, such as 40% to 50% by weight, based on the total weight of the binder.

According to the present invention, the powder coating composition optionally may comprise an electrically insulative filler. As used herein, the term "electrically insulative filler" means a pigment, filler, or inorganic powder that has a volume resistivity of at least 10 am (measured according to ASTM D257, C611, or B193). For example, the electrically insulative filler may have a volume resistivity of at least 10 $\Omega \cdot m$ (measured according to ASTM D257, C611, or B193), such as at least 20 $\Omega \cdot m$, such as at least 30 $\Omega \cdot m$, such as at least 40 $\Omega \cdot m$, such as at least 50 $\Omega \cdot m$, such as at least 60 $\Omega \cdot m$, such as at least 60 $\Omega \cdot m$, such as at least 70 $\Omega \cdot m$, such as at least 80 $\Omega \cdot m$, such as at least 80 $\Omega \cdot m$, such as at least 90 $\Omega \cdot m$, such as at least 100 $\Omega \cdot m$.

The electrically insulative filler may comprise a thermally conductive, electrically insulative filler material. As used herein, the term "thermally conductive, electrically insulative filler" or "TC/EI filler" means a pigment, filler, or inorganic powder that has a thermal conductivity of at least 5 W/m·K at 25° C. (measured according to ASTM D7984) and a volume resistivity of at least 10 $\Omega \cdot m$ (measured according to ASTM D257, C611, or B193). The TC/EI filler material may comprise organic or inorganic material and may comprise particles of a single type of filler material or may comprise particles of two or more types of TC/EI filler materials. That is, the TC/EI filler material may comprise particles of a first TC/EI filler material and may further comprise particles of at least a second (i.e., a second, a third, a fourth, etc.) TC/EI filler material that is different from the first TC/EI filler material. As used herein with respect to types of filler material, reference to "first," "second", etc. is for convenience only and does not refer to order of addition or the like.

The TC/EI filler material may have a thermal conductivity of at least 5 W/m·K at 25° C. (measured according to ASTM D7984), such as at least 18 W/m·K, such as at least 55 W/m·K. The TC/EI filler material may have a thermal conductivity of no more than 3,000 W/m·K at 25° C. (measured according to ASTM D7984), such as no more than 1,400 W/m·K, such as no more than 450 W/m·K. The TC/EI filler material may have a thermal conductivity of 5 W/m·K to 3,000 W/m·K at 25° C. (measured according to ASTM D7984), such as 18 W/m·K to 1,400 W/m·K, such as 55 W/m·K to 450 W/m·K.

The TC/EI filler material may have a volume resistivity of at least 10 $\Omega \cdot m$ (measured according to ASTM D257, C611, or B193), such as at least 20 $\Omega \cdot m$, such as at least 30 $\Omega \cdot m$, such as at least 40 $\Omega \cdot m$, such as at least 50 $\Omega \cdot m$, such as at least 60 $\Omega \cdot m$, such as at least 60 $\Omega \cdot m$, such as at least 70 $\Omega \cdot m$, such as at least 80 $\Omega \cdot m$, such as at least 80 $\Omega \cdot m$, such as at least 90 $\Omega \cdot m$, such as at least 100 $\Omega \cdot m$.

13

14

Suitable non-limiting examples of TC/EI filler materials include nitrides, metal oxides, metalloid oxides, metal hydroxides, arsenides, carbides, minerals, ceramics, and diamond. For example, the TC/EI filler material may comprise, consist essentially of, or consist of boron nitride, silicon nitride, aluminum nitride, boron arsenide, aluminum oxide, magnesium oxide, dead burned magnesium oxide, beryllium oxide, silicon dioxide, titanium oxide, zinc oxide, nickel oxide, copper oxide, tin oxide, aluminum hydroxide (i.e., aluminum trihydrate), magnesium hydroxide, boron arsenide, silicon carbide, agate, emery, ceramic microspheres, diamond, or any combination thereof. Non-limiting examples of commercially available TC/EI filler materials of boron nitride include, for example, CarboTherm from Saint-Gobain, CoolFlow and PolarTherm from Momentive, and as hexagonal boron nitride powder available from Panadyne; of aluminum nitride, for example, aluminum nitride powder available from Micron Metals Inc., and as Toyalnite from Toyal; of aluminum oxide include, for example, Microgrit from Micro Abrasives, Nabalox from Nabaltec, Aeroxide from Evonik, and as Alodur from Imerys; of dead burned magnesium oxide include, for example, MagChem® P98 from Martin Marietta Magnesia Specialties; of aluminum hydroxide include, for example, APYRAL from Nabaltec GmbH and aluminum hydroxide from Sibelco; and of ceramic microspheres include, for example, ceramic microspheres from Zeeospheres Ceramics or 3M. These fillers can also be surface modified. For example, surface modified magnesium oxide available as PYROKISUMA 5301K available from Kyowa Chemical Industry Co., Ltd. Alternatively, the TC/EI filler materials may be free of any surface modification.

As used herein, the term "dead burned magnesium oxide" refers to magnesium oxide that has been calcined at high-temperatures (e.g., ranging from 1500° C. — 2000° C. in a high temperature shaft kiln) yielding a material with very little reactivity relative to magnesium oxide that has not been calcined.

The TC/EI filler material may be included as a single TC/EI filler material or may be included as a combination of two or more of the TC/EI filler materials described above. For example, the thermally conductive, electrically insulative filler materials comprise, consist essentially of, or consist of at least two of aluminum hydroxide, dead burned magnesium oxide, and boron nitride. For example, the thermally conductive, electrically insulative filler materials comprise, consist essentially of, or consist of aluminum hydroxide and dead burned magnesium oxide. For example, the thermally conductive, electrically insulative filler materials comprise, consist essentially of, or consist of aluminum hydroxide and boron nitride. If more than two TC/EI filler materials are used, the weight ratio between the two TC/EI filler materials may be at least 1:30, such as at least 1:25, such as at lest 1:20, such as at least 1:15, such as at least 1:10, such as at least 1:8, such as at least 1:7, such as at least 1:5, such as at least 1:4, such as at least 1:3, such as at least 1:2.5, such as at least 1:2, such as 1:1.5, such as at least 1:1.4, such as at least 1:1.2, such as 1:1, based on the total combined weight of the TC/EI filler material. If more than two TC/EI filler materials are used, the weight ratio between the two TC/EI filler materials may be 1:30 to 30:1, such as 1:25 to 25:1, such as 1:20 to 20:1, such as 1:15 to 15:1, such as 1:10 to 10:1, such as 1:8 to 8:1, such as 1:7 to 7:1, such as 1:5 to 5;1, such as 1:3 to 3:1, such as 1:2 to 2:1, such as 1:1.5 to 1.5:1, such as 1:1.4 to 1.4:1, such as 1:1.2 to 1.2:1, such as 1:2 to 1.4:1, such as 1:2 to 1.5:1, based on the total combined weight of the TC/EI filler material.

For example, the thermally conductive, electrically insulative filler material may comprise, consist essentially of, or consist of aluminum hydroxide in an amount of 1% to 80% by weight, such as 10% to 60% by weight, such as 15% to 50% by weight, such as 20% to 40% by weight, such as 25% to 35% by weight, such as 27% to 33% by weight, and dead burned magnesium oxide in an amount of 1% to 80% by weight, such as 5% to 60% by weight, such as 7% to 50% by weight, such as 10% to 40% by weight, such as 12% to 35% by weight, such as 15% to 30% by weight, such as 17% to 25% by weight, such as 18% to 22% by weight, based on the total weight of the powder coating composition.

For example, the thermally conductive, electrically insulative filler material may comprise, consist essentially of, or consist of aluminum hydroxide in an amount of 1% to 80% by weight, such as 10% to 60% by weight, such as 15% to 50% by weight, such as 20% to 40% by weight, such as 25% to 35% by weight, such as 27% to 33% by weight, and boron nitride in an amount of 1% to 80% by weight, such as 5% to 60% by weight, such as 7% to 50% by weight, such as 10% to 40% by weight, such as 12% to 35% by weight, such as 15% to 30% by weight, such as 17% to 25% by weight, such as 18% to 22% by weight, based on the total weight of the powder coating composition.

For example, the thermally conductive, electrically insulative filler material of the powder coating composition may comprise, consist essentially of, or consist of aluminum hydroxide.

The electrically insulative filler may comprise a non-thermally conductive, electrically insulative filler material. As used herein, the term "non-thermally conductive, electrically insulative filler" or "NTC/EI filler" means a pigment, filler, or inorganic powder that has a thermal conductivity of less than 5 W/m·K at 25° C. (measured according to ASTM D7984) and a volume resistivity of at least 10 Ω·m (measured according to ASTM D257, C611, or B193). For example, the NTC/EI filler may have a thermal conductivity of less than 5 W/m·K at 25° C. (measured according to ASTM D7984, such no more than 3 W/m·K , such as no more than 1 W/m·K, such as no more than 0.1 W/m·K, such as no more than 0.05 W/m·K. For example, the NTC/EI filler may have a volume resistivity of at least 10 Ω·m (measured according to ASTM D257, C611, or B193), such as at least 20 Ω·m, such as at least 30 Ω·m, such as at least 40 Ω·m, such as at least 50 Ω·m, such as at least 60 Ω·m, such as at least 60 Ω·m, such as at least 70 Ω·m, such as at least 80 Ω·m, such as at least 80 Ω·m, such as at least 90 Ω·m, such as at least 100 Ω·m. The NTC/EI filler material may be organic or inorganic.

Suitable non-limiting examples of NTC/EI filler materials include but are not limited to mica, silica, wollastonite, barium sulfate, calcium carbonate, glass microspheres, clay, or any combination thereof.

As used herein, the term "mica" generally refers to sheet silicate (phyllosilicate) minerals. The mica may comprise muscovite mica. Muscovite mica comprises a phyllosilicate mineral of aluminum and potassium with the formula $KAl_2$ $(AlSi_3O_{10})(F,OH)_2$ or $(KF)_2(Al_2O_3)_3(SiO_2)_6(H_2O)$. Exemplary non-limiting commercially available muscovite mica include products sold under the trade name DakotaPURE™, such as DakotaPURE™ 700, DakotaPURE™ 1500, DakotaPURE™ 2400, DakotaPURE™ 3000, DakotaPURE™ 3500 and DakotaPURE™ 4000, available from Pacer Minerals.

The silica ($SiO_2$) may comprise fumed silica which comprises silica that has been treated with a flame to form a three-dimensional structure. The fumed silica may be untreated or surface treated with a siloxane, such as, for example, polydimethylsiloxane. Exemplary non-limiting commercially available fumed silica includes products solder under the trade name AEROSIL®, such as AEROSIL® R 104, AEROSIL® R 106, AEROSIL® R 202, AEROSIL® R 208, AEROSIL® R 972 commercially available from Evonik Industries and products sold under the trade name HDK® such as HDK® H17 and HDK® H18 commercially available from Wacker Chemie AG.

Wollastonite comprises a calcium inosilicate mineral (CaSiO$_3$) that may contain small amounts of iron, aluminum, magnesium, manganese, titanium and/or potassium. For example, the wollastonite may have a B.E.T. surface area of 1.5 to 2.1 m$^2$/g, such as 1.8 m$^2$/g and a median particle size of 6 microns to 10 microns, such as 8 microns. Non-limiting examples of commercially available wollastonite include NYAD 400 available from NYCO Minerals, Inc.

The calcium carbonate (CaCO$_3$) may comprise a precipitated calcium carbonate or a ground calcium carbonate. The calcium carbonate may or may not be surface treated with stearic acid. Non-limiting examples of commercially available precipitated calcium carbonate include Ultra-Pflex®, Albafil®, and Albacar HO® available from Specialty Minerals and Winnofil® SPT available from Solvay. Non-limiting examples of commercially available ground calcium carbonate include Duramite™ available from IMERYS and Marblewhite® available from Specialty Minerals.

Useful clay minerals include a non-ionic platy filler such as talc, pyrophyllite, chlorite, vermiculite, or combinations thereof.

The glass microspheres may be hollow borosilicate glass. Non-limiting examples of commercially available glass microspheres include 3M Glass bubbles type VS, K series, and S series available from 3M.

The electrically insulative filler material may have any particle shape or geometry. For example, the electrically insulative filler material may be spherical, ellipsoidal, cubical, platy, acicular (elongated or fibrous), rod-shaped, disk-shaped, prism-shaped, flake-shaped, etc., agglomerates thereof, and any combination thereof.

Particles of electrically insulative filler material may have a reported average particle size in at least one dimension of at least 0.01 microns, as reported by the manufacturer, such as at least 2 microns, such as at least 10 microns. Particles of electrically insulative filler material may have a reported average particle size in at least one dimension of no more than 500 microns as reported by the manufacturer, such as no more than 300 microns, such as no more than 200 microns, such as no more than 150 microns. The particles of electrically insulative filler material may have a reported average particle size in at least one dimension of 0.01 microns to 500 microns as reported by the manufacturer, such as 0.1 microns to 300 microns, such as 2 microns to 200 microns, such as 10 microns to 150 microns. Suitable methods of measuring average particle size include measurement using an instrument such as the Quanta 250 FEG SEM or an equivalent instrument.

Particles of electrically insulative filler material of the powder coating composition may have a reported Mohs hardness of at least 1 (based on the Mohs Hardness Scale), such as at least 2, such as at least 3. Particles of electrically insulative filler material of the powder coating composition may have a reported Mohs hardness of no more than 10, such as no more than 8, such as no more than 7. Particles of electrically insulative filler material of the powder coating composition may have a reported Mohs hardness of 1 to 10, such as 2 to 8, such as 3 to 7.

The electrically insulative filler material of the powder coating composition may be present in an amount of at least 1% by weight, such as at least 5% by weight, such as at least 10% by weight, such as at least 20% by weight, such as at least 25% by weight, such as at least 30% by weight, such as at least 35% by weight, such as at least 40% by weight, such as at least 45% by weight, such as at least 50% by weight, such as at least 55% by weight, such as at least 60% by weight, such as at least 65% by weight, such as at least 70% by weight, such as at least 75% by weight, based on the total weight of the powder coating composition. The electrically insulative filler material of the powder coating composition may be present in an amount of no more than 80% by weight, such as no more than 75% by weight, such as no more than 70% by weight, such as no more than 65% by weight, such as no more than 60% by weight, such as no more than 55% by weight, such as no more than 50% by weight, such as no more than 45% by weight, such as no more than 40% by weight, such as no more than 35% by weight, such as no more than 30% by weight, such as no more than 25% by weight, such as no more than 20% by weight, such as no more than 15% by weight, such as no more than 10% by weight, such as no more than 5% by weight, based on the total weight of the powder coating composition. The electrically insulative filler material of the powder coating composition may be present in an amount of 1% to 80% by weight, such as 5% to 80% by weight, such as 10% to 80% by weight, such as 15% to 80% by weight, such as 20% to 80% by weight, such as 25% to 80% by weight, such as 30% to 80% by weight, such as 35% to 80% by weight, such as 40% to 80% by weight, such as 45% to 80% by weight, such as 50% to 80% by weight, such as 55% to 80% by weight, such as 60% to 80% by weight, such as 65% to 80% by weight, such as 70% to 80% by weight, such as 75% to 80% by weight, such as 1% to 70% by weight, such as 5% to 70% by weight, such as 10% to 70% by weight, such as 15% to 70% by weight, such as 20% to 70% by weight, such as 25% to 70% by weight, such as 30% to 70% by weight, such as 35% to 70% by weight, such as 40% to 70% by weight, such as 45% to 70% by weight, such as 50% to 70% by weight, such as 55% to 70% by weight, such as 60% to 70% by weight, such as 65% to 70% by weight, such as 1% to 65% by weight, such as 5% to 65% by weight, such as 10% to 65% by weight, such as 15% to 65% by weight, such as 20% to 65% by weight, such as 25% to 65% by weight, such as 30% to 65% by weight, such as 35% to 65% by weight, such as 40% to 65% by weight, such as 45% to 65% by weight, such as 50% to 65% by weight, such as 55% to 65% by weight, such as 1% to 60% by weight, such as 5% to 60% by weight, such as 10% to 60% by weight, such as 15% to 60% by weight, such as 20% to 60% by weight, such as 25% to 60% by weight, such as 25% to 60% by weight, such as 30% to 60% by weight, such as 35% to 60% by weight, such as 40% to 60% by weight, such as 45% to 60% by weight, such as 50% to 60% by weight, such as 55% to 60% by weight, such as 1% to 55% by weight, such as 5% to 55% by weight, such as 10% to 55% by weight, such as 15% to 55% by weight, such as 20% to 55% by weight, such as 25% to 55% by weight, such as 30% to 55% by weight, such as 35% to 55% by weight, such as 40% to 55% by weight, such as 45% to 55% by weight, such as 1% to 50% by weight, such as 5% to 50% by weight, such as 10% to 50% by weight, such as 15% to 50% by weight, such as 20% to 50% by weight, such as 25% to 50% by weight, such as 30% to 50% by weight, such as 35% to 50% by weight, such as 40% to 50% by weight, such as 45% to 50% by weight, such as 1% to 45% by weight, such as 5% to 45% by weight, such as 10% to 45% by weight, such as 15% to 45% by weight, such as 20% to 45% by weight, such as 25% to 45% by weight, such as 30% to 45% by weight, such as 35% to 45% by weight, such as 40% to 45% by weight, such as 1% to 40% by weight, such as 5% to 40% by weight, such as 10% to 40% by weight, such as 15% to 40% by weight, such as 20% to 40% by weight, such as 25% to 40% by weight, such as 30% to 40% by weight, such as 35% to 40% by weight, such as 1% to 35% by weight, such as 5% to 35% by weight, such as 10% to 35% by weight, such as 15% to 35% by weight, such as 20% to 35% by weight, such as 25% to 35% by weight, such as 30% to 35% by weight, such as 1% to 25% by weight, such as 5% to 25% by weight, such as 10% to 25% by weight, such as 15% to 25% by weight, such as 20% to 25% by weight, such as 1% to 20% by weight, such as 5% to 20% by weight, such as 10% to 20% by weight, such as 15% to 20% by weight, such as 1% to 15% by weight, such as 5% to 15% by weight, such as 10% to 15% by weight, such as 1% to 10% by weight, such as 5% to 10% by weight, based on the total weight of the powder coating composition.

The electrically insulative filler material may be present in an amount of at least 1% by volume, such as at least 5% by volume, such as at least 25% by volume, such as at least 30% by volume, based on the total volume of the powder coating composition. The electrically insulative filler material may be present in an amount of no more than 70% by volume, such as no more than 50% by volume, such as no more than 30% by volume, based on the total volume of the powder coating composition. The electrically insulative filler material may be present in an amount of 1% to 70% by volume, such as 5% to 50% by volume, such as 25% to 50% by volume, such as 30% to 50% by volume, based on the total volume of the powder coating composition.

According to the present invention, the powder coating composition and binder may optionally comprise a thermoplastic material. As used herein, the term "thermoplastic material" refers to a compound that has a higher molecular weight than the film-forming resin and crosslinker (if present) of the powder coating composition. The thermoplastic material optionally may be free of functional groups that react with the crosslinker of the powder coating composition under normal cure conditions. The thermoplastic material is part of the binder of the powder coating composition and is different than the film-forming resins and crosslinker (if present) of the binder of thermoset and thermoplastic powder coating compositions described above. The thermoplastic material may comprise a phenoxy resin (a polyhydroxyether resin).

The thermoplastic material may have a melt temperature (Tm) of at least 50° C., such as at least 60° C., such as at least 70° C., such as at least 80° C., such as at least 90° C., such as at least 100° C., such as at least 110° C., such as at least 120° C., such as at least 130° C., such as at least 140° C., such as at least 150° C., such as at least 160° C., such as 120° C.

The thermoplastic material may have a glass transition temperature (Tg) of at least −30° C., such as at least −20° C., such as at least −10° C., such as at least 0° C., such as at least 10° C., such as at least 20° C., such as at least 30° C., such as at least 40° C., such as at least 50° C., such as at least 60° C., such as at least 70° C., such as at least 75° C., such as at least 80° C., such as at least 84° C., such as 84° C.

The thermoplastic material may have a melt index at 200° C. of at least at least 40 g/10 min., such as at least 45 g/10 min., such as at least 50 g/10 min., such as at least 55 g/10 min., such as at least 60 g/10 min., such as 60 g/10 min.

The thermoplastic material may have a melt viscosity at 200° C. of at least 90 Poise, such as at least 95 Poise, such as at least 100 Poise, such as at least 105 Poise, such as at least 110 Poise, such as at least 112 Poise, such as 112 Poise.

The thermoplastic material in a 20% by weight solution in cyclohexanone may have a viscosity range of 180-300 cP, such as 180-280 cP, as measured using a Brookfield viscometer at 25° C.

The thermoplastic material may have a weight average molecular weight of at least 10,000 g/mol, such as at least 15,000 g/mol, such as at least 20,000 g/mol, such as at least 25,000 g/mol, such as at least 30,000 g/mol. The thermoplastic material may have a weight average molecular weight of no more than 1,000,000 g/mol, such as no more than 500,000 g/mol, such as no more than 100,000 g/mol, such as no more than 50,000 g/mol, such as no more than 40,000 g/mol, such as no more than 35,000 g/mol. The thermoplastic material may have a weight average molecular weight of 10,000 to 1,000,000 g/mol, such as 15,000 to 500,000 g/mol, such as 15,000 to 100,000 g/mol, such as 15,000 to 50,000 g/mol, such as 15,000 to 40,000 g/mol, such as 15,000 to 35,000 g/mol, such as 20,000 to 1,000,000 g/mol, such as 20,000 to 500,000 g/mol, such as 20,000 to 100,000 g/mol, such as 20,000 to 50,000 g/mol, such as 20,000 to 40,000 g/mol, such as 20,000 to 35,000 g/mol, 25,000 to 1,000,000 g/mol, such as 25,000 to 500,000 g/mol, such as 25,000 to 100,000 g/mol, such as 25,000 to 50,000 g/mol, such as 25,000 to 40,000 g/mol, such as 25,000 to 35,000 g/mol, 30,000 to 1,000,000 g/mol, such as 30,000 to 500,000 g/mol, such as 30,000 to 100,000 g/mol, such as 30,000 to 50,000 g/mol, such as 30,000 to 40,000 g/mol, such as 30,000 to 35,000 g/mol, such as 32,000 g/mol.

The thermoplastic material may have a number average molecular weight of at least 5,000 g/mol, such as at least 8,000 g/mol, such as at least 9,000 g/mol. The thermoplastic material may have a number average molecular weight of no more than 100,000 g/mol, such as no more than 50,000 g/mol, such as no more than 25,000 g/mol, such as no more than 15,000 g/mol, such as no more than 10,000 g/mol. The thermoplastic material may have a number average molecular weight of 5,000 to 100,000 g/mol, 5,000 to 50,000 g/mol, 5,000 to 25,000 g/mol, 5,000 to 15,000 g/mol, 5,000 to 10,000 g/mol, such as 8,000 to 100,000 g/mol, 8,000 to 50,000 g/mol, such as 8,000 to 25,000 g/mol, such as 8,000 to 15,000 g/mol, such as 8,000 to 10,000 g/mol, such as 9,000 to 100,000 g/mol, 9,000 to 50,000 g/mol, such as 9,000 to 25,000 g/mol, such as 9,000 to 15,000 g/mol, such as 9,000 to 10,000 g/mol, such as 9,500 g/mol.

Weight average molecular weight ($M_w$) and number average molecular weight ($M_n$) may be measured by gel permeation chromatography using a polystyrene standard according to ASTM D6579-11. The gel permeation chromatography relative to linear polystyrene standards of 800 to 900,000 Da may be performed using a Waters 2695 separation module with a Waters 2414 differential refractometer (RI detector), tetrahydrofuran (THF) as the eluent at a flow rate of 1 ml/min, and with two PLgel Mixed-C (300×7.5 mm) columns for separation performed at room temperature.

The thermoplastic material may optionally comprise functional groups. For example, the thermoplastic material may comprise hydroxyl functional groups. A thermoplastic material comprising hydroxyl functional groups may have a hydroxyl equivalent weight of at least 200 g/equivalent, such as at least 240 g/equivalent, such as at least 250 g/equivalent, such as at least 260 g/equivalent, such as at least 270 g/equivalent. A thermoplastic material comprising hydroxyl functional groups may have a hydroxyl equivalent weight of no more than 500,000 g/equivalent, such as no more than 250,000 g/equivalent, such as no more than 100,000 g/equivalent, such as no more than 50,000 g/equivalent, such as no more than 25,000 g/equivalent, such as no more than 10,000 g/equivalent, such as no more than 1,000 g/equivalent, such as no more than 500 g/equivalent, such as no more than 350 g/equivalent, such as no more than 300 g/equivalent, such as no more than 285 g/equivalent. A thermoplastic material comprising hydroxyl functional groups may have a hydroxyl equivalent weight of such as 200 to 500,000 g/equivalent, such as 200 to 250,000 g/equivalent, such as 200 to 100,000 g/equivalent, such as 200 to 50,000 g/equivalent, such as 200 to 25,000 g/equivalent, such as 200 to 10,000 g/equivalent, such as 200 to 1,000 g/equivalent, such as 200 to 500 g/equivalent, such as 200 to 350 g/equivalent, such as 240 to 350 g/equivalent, such as 250 to 350 g/equivalent, such as 260 to 300 g/equivalent, such as 260 to 300 g/equivalent, such as 200 to 300 g/equivalent, such as 240 to 300 g/equivalent, such as 250 to 300 g/equivalent, such as 260 to 300 g/equivalent, such as 260 to 300 g/equivalent, such as 200 to 285 g/equivalent, such as 240 to 285 g/equivalent, such as 250 to 285 g/equivalent, such as 260 to 285 g/equivalent, such as 260 to 285 g/equivalent, such as 277 g/equivalent.

The thermoplastic material may be present in the powder coating composition, if at all, in an amount of at least 0.5% by weight, such as at least 1% by weight, such as at least 3% by weight, such as at least 6% by weight, such as at least 7% by weight, based on the total weight of the powder coating composition. The thermoplastic material may be present in the powder coating composition, if at all, in an amount of no more than 20%, such as no more than 10% by weight, such as no more than 9% by weight, such as no more than 8.5% by weight, based on the total weight of the powder coating composition. The thermoplastic material may be present in an amount of 0.5% to 20% by weight, such as 0.5% to 10% by weight, such as 0.5% to 9% by weight, such as 0.5% to 8.5% by weight, such as 1% to 20% by weight, such as 1% to 10% by weight, such as 1% to 9% by weight, such as 1% to 8.5% by weight, such as 3% to 20% by weight, such as 3% to 10% by weight, such as 3% to 9% by weight, such as 3% to 8.5% by weight, such as 6% to 20% by weight, such as 6% to 10% by weight, such as 6% to 9% by weight, such as 6% to 8.5% by weight, such as 7% to 20% by weight, such as 7% to 10% by weight, such as 7% to 9% by weight, such as 7% to 8.5% by weight, based on the total weight of the powder coating composition.

The thermoplastic material may be present in the powder coating composition, if at all, in an amount of at least 1% by volume, such as at least 4% by volume, such as at least 7% by volume, based on the total volume of the powder coating composition. The thermoplastic material may be present in the powder coating composition, if at all, in an amount of no more than 30% by volume, such as no more than 15% by volume, such as no more than 8% by volume, based on the total volume of the powder coating composition. The thermoplastic material may be present in an amount of 1% to 30% by volume, such as 4% to 15% by volume, such as 6% to 10% by volume, based on the total volume of the powder coating composition.

The powder coating composition may optionally further comprise a thermally conductive, electrically conductive filler. As used herein, the term "thermally conductive, electrically conductive filler" or "TC/EC filler" means a pigment, filler, or inorganic powder that has a thermal conductivity of at least 5 W/m·K at 25° C. (measured according to ASTM D7984) and a volume resistivity of less than 10 Ω·m (measured according to ASTM D257, C611, or B193). For example, the TC/EC filler material may have a thermal conductivity of at least 5 W/m·K at 25° C. (measured according to ASTM D7984), such as at least 18 W/m·K, such as at least 55 W/m·K. The TC/EC filler material may have a thermal conductivity of no more than 3,000 W/m·K at 25° C. (measured according to ASTM D7984), such as no more than 1,400 W/m·K, such as no more than 450 W/m·K. The TC/EC filler material may have a thermal conductivity of 5 W/m·K to 3,000 W/m·K at 25° C. (measured according to ASTM D7984), such as 18 W/m·K to 1,400 W/m·K, such as 55 W/m·K to 450 W/m·K. For example, the TC/EC filler material may have a volume resistivity of less than 10 Ω·m (measured according to ASTM D257, C611, or B193), such as less than 5 Ω·m, such as less than 1 Ω·m.

Suitable TC/EC filler materials include metals such as silver, zinc, copper, gold, or metal coated hollow particles. carbon compounds such as, graphite (such as Timrex commercially available from Imerys or ThermoCarb commercially available from Asbury Carbons), carbon black (for example, commercially available as Vulcan from Cabot Corporation), carbon fibers (for example, commercially available as milled carbon fiber from Zoltek), graphene and graphenic carbon particles (for example, xGnP graphene nanoplatelets commercially available from XG Sciences, and/or for example, the graphene particles described below), carbonyl iron, copper (such as spheroidal powder commercially available from Sigma Aldrich), zinc (such as Ultrapure commercially available from Purity Zinc Metals and Zinc Dust XL and XLP available from US Zinc), and the like.

Examples of "graphenic carbon particles" include carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference.

The TC/EC filler material may have any particle shape or geometry. For example, the TC/EC filler material may be a regular or irregular shape and may be spherical, ellipsoidal, cubical, platy, acicular (elongated or fibrous), rod-shaped, disk-shaped, prism-shaped, flake-shaped, rock-like, etc., agglomerates thereof, and any combination thereof.

Particles of the TC/EC filler material may have a reported average particle size in at least one dimension of at least 0.01 microns, as reported by the manufacturer, such as at least 2 microns, such as at least 10 microns. Particles of the TC/EC filler material may have a reported average particle size in at least one dimension of no more than 500 microns as reported by the manufacturer, such as no more than 300 microns, such as no more than 200 microns, such as no more than 150 microns. Particles of the TC/EC filler material may have a reported average particle size in at least one dimension of 0.01 microns to 500 microns as reported by the manufacturer, such as 0.1 microns to 300 microns, such as 2 microns to 200 microns, such as 10 microns to 150 microns. Suitable methods of measuring average particle size include measurement using an instrument such as the Quanta 250 FEG SEM or an equivalent instrument.

Particles of TC/EC filler material of the powder coating composition may have a reported Mohs hardness of at least 1 (based on the Mohs Hardness Scale), such as at least 2, such as at least 3. Particles of TC/EC filler material of the powder coating composition may have a reported Mohs hardness of no more than 10, such as no more than 8, such as no more than 7. Particles of TC/EI filler material of the powder coating composition may have a reported Mohs hardness of 1 to 10, such as 2 to 8, such as 3 to 7.

The TC/EC filler materials may be present in the powder coating composition, if at all, in an amount of at least 1% by weight, such as at least 2% by weight, such as at least 3% by weight, such as at least 4% by weight, based on the total weight of the powder coating composition. The TC/EC filler materials may be present in the powder coating composition, if at all, in an amount of no more than 35% by weight, such as no more than 20% by weight, such as no more than 10% by weight, such as no more than 8% by weight, based on the total weight of the powder coating composition. The TC/EC filler materials may be present in an amount of 1% to 35% by weight, such as 2% to 20% by weight, such as 3% to 10% by weight, such as 4% to 8% by weight, based on the total weight of the powder coating composition.

The TC/EC filler materials may be present in the powder coating composition, if at all, in an amount of at least 1% by volume, such as at least 5% by volume, such as at least 10% by volume, such as at least 20% by volume, based on the total volume of the powder coating composition. The TC/EC filler materials may be present in the powder coating composition, if at all, in an amount of no more than 30% by volume, such as no more than 25% by volume, such as no more than 20% by volume, such as no more than 15% by volume, based on the total volume of the powder coating composition. The TC/EC filler materials may be present in an amount of 1% to 30% by volume, such as 1% to 25% by volume, such as 5% to 20% by volume, such as 10% to 15% by volume, based on the total volume of the powder coating composition.

According to the present invention, the powder coating composition optionally may further comprise a dispersant. As used herein, the term "dispersant" refers to a substance that may be added to the composition in order to improve the separation of the filler particles by wetting the particles and breaking apart agglomerates. The dispersant, if present at all, may be present in the composition in an amount of at least 0.05% by volume, based on total volume of the filler, such as at least 0.2% by volume, and may be present in an amount of no more than 20% by volume, based on total volume of the filler, such as no more than 10% by volume, such as no more than 3% by volume, such as no more than 1% by volume. The dispersant, if present at all, may be present in the composition in an amount of 0.05% by volume to 20% by volume, based on total volume of the filler, such as 0.2% by volume to 10% by volume, such as 0.2% by volume to 3% by volume, such as 0.2% by volume to 1% by volume. As used herein, the filler refers to the non-binder additives included in the powder coating composition, such as the thermally conductive, electrically insulative filler material, the non-thermally conductive, electrically insulative filler material, the non-thermally conductive, electrically conductive filler material, and any other colorant or pigments included in the composition. Suitable dispersants for use in the composition include fatty acid, phosphoric acid esters, polyurethanes, polyamines, polyacrylates, polyalkoxylates, sulfonates, polyethers, and polyesters, or any combination thereof. Non-limiting examples of commercially available dispersants include ANTI-TERRA-U100, DISPERBYK-102, DISPERBYK-103, DISPERBYK-111, DISPERBYK-171, DISPERBYK-2151, DISPERBYK-2059, DISPERBYK-2000, DISPERBYK-2117, and DISPERBYK-2118 available from BYK Company; and SOLSPERSE 24000SC, SOLSPERSE 16000 and SOLSPERSE 8000 hyperdispersants available from The Lubrizol Corporation.

According to the present invention, the powder coating composition optionally may further comprise a core-shell polymer. Examples of the core-shell polymer include particles wherein a core composed of an elastomer polymer is covered with a shell layer composed of a glassy polymer, particles wherein a core composed of a glassy polymer is covered with a shell layer composed of an elastomer polymer, and particles having three-layer structures wherein the two-layer structures above are covered with a third outermost layer. Where necessary, the shell layer or the outermost layer may be modified so that functional groups such as carboxyl group, epoxy group and hydroxyl group will be introduced therein to provide compatibility and reactivity with the thermosetting resin. Examples of the cores include polybutadienes, acrylic polymers and polyisoprenes. Examples of the shell layers include alkyl (meth)acrylate copolymers, alkyl (meth)acrylate-styrene copolymers and alkyl (meth)acrylate copolymers. In examples, the core may be composed of a rubber polymer with a glass transition temperature of not more than room temperature such as polybutadiene, and a shell layer is composed of an alkyl (meth)acrylate polymer or copolymer with a glass transition temperature of not less than 60° C.

The term "glass transition temperature" or "Tg" is the temperature at which a glass transition occurs, i.e., a reversible transition from hard and relatively brittle glassy state into a viscous or rubbery state. The glass transition temperature may be a measured or theoretical value. For example, the theoretical glass transition temperature of (meth)acrylic polymers may be calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook 3$^{rd}$ edition, John Wiley, New York, 1989.

Examples of the core-shell polymer includes STAPHYLOID IM-101, STAPHYLOID IM-203, STAPHYLOID IM-301, STAPHYLOID IM-401, STAPHYLOID IM-601, STAPHYLOID AC3355, STAPHYLOID AC3816, STAPHYLOID AC3832, STAPHYLOID AC4030, STAPHYLOID AC3364 (manufactured by GANZ CHEMICAL CO., LTD.), KUREHA BTA751, KUREHA BTA731, KUREHA PARALOID EXL2314, KUREHA PARALOID EXL2655 (manufactured by KUREHA CORPORATION), Albidur 2240, Albidur 5340, Albidur 5640 (manufactured by Hanse Chemie), PARALOID EXL2655, PARALOID EXL2605, PARALOID EXL2602, PARALOID EXL2311, PARALOID EXL2313, PARALOID EXL2314, PARALOID EXL2315, PARALOID BTA705, PARALOID BTA712, PARALOID BTA731, PARALOID BTA751, PARALOID KM357P, PARALOID KM336P, PARALOID HIA80 and PARALOID HIA28S (manufactured by Rohm and Hass Company).

The core-shell polymer may have a spherical or substantially spherical shape. As used herein, the words "substantially spherical" mean that the longer diameter/shorter diameter ratio in an arbitrary elliptical cross section is from 1 to 10. The core-shell polymer may have an average particle diameter of 0.01 to 10 μm, such as 0.1 to 5 μm. In the invention, the average particle diameter indicates a biaxial average particle diameter represented by (longer axis+ shorter axis)/2. The average particle diameter may be determined by laser diffraction particle size distribution analysis.

The core-shell polymer may be present in the powder coating composition, if at all, in an amount of at least 1% by weight, such as at least 2% by weight, such as at least 3% by weight, such as at least 4% by weight, based on the total weight of the powder coating composition. The core-shell polymer may be present in the powder coating composition, if at all, in an amount of no more than 35% by weight, such as no more than 20% by weight, such as no more than 10% by weight, such as no more than 8% by weight, based on the total weight of the powder coating composition. The core-shell polymer may be present in an amount of 1% to 35% by weight, such as 1% to 20% by weight, such as 1% to 10% by weight, such as 1% to 8% by weight, such as 2% to 35% by weight, such as 2% to 20% by weight, such as 2% to 10% by weight, such as 2% to 8% by weight, such as 3% to 35% by weight, such as 3% to 20% by weight, such as 3% to 10% by weight, such as 3% to 8% by weight, such as 4% to 35% by weight, such as 4% to 20% by weight, such as 4% to 10% by weight, such as 4% to 8% by weight, based on the total weight of the powder coating composition.

The core-shell polymer may be present in the powder coating composition, if at all, in an amount of at least 1% by volume, such as at least 5% by volume, such as at least 10% by volume, such as at least 20% by volume, based on the total volume of the powder coating composition. The core-shell polymer may be present in the powder coating composition, if at all, in an amount of no more than 30% by volume, such as no more than 25% by volume, such as no more than 20% by volume, such as no more than 15% by volume, based on the total volume of the powder coating composition. The core-shell polymer may be present in an amount of 1% to 30% by volume, such as 1% to 25% by volume, such as 5% to 20% by volume, such as 10% to 15% by volume, based on the total volume of the powder coating composition.

The powder coating composition of the present invention may comprise, consist essentially of, or consist of a binder comprising, consisting essentially of, or consisting of an epoxy resin; a core/shell polymer; and a thermally conductive, electrically insulative filler material. The thermally conductive, electrically insulative filler material may comprise, consist essentially of, or consist of boron nitride, silicon nitride, aluminum nitride, boron arsenide, aluminum oxide, magnesium oxide, dead burned magnesium oxide, beryllium oxide, silicon dioxide, titanium oxide, zinc oxide, nickel oxide, copper oxide, tin oxide, aluminum hydroxide (i.e., aluminum trihydrate), magnesium hydroxide, boron arsenide, silicon carbide, agate, emery, ceramic microspheres, diamond, or any combination thereof. The thermally conductive, electrically insulative filler material may comprise, consist essentially of, or consist of aluminum hydroxide and/or boron nitride.

The powder coating composition can also include other optional materials. For example, the powder coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/ or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings for example by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), and any mixture thereof.

Example dyes include, but are not limited to, those that are solvent and/or aqueous based such as phthalo green or blue, iron oxide, bismuth vanadate, anthraquinone, and perylene and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Further, the powder coating composition may be substantially free, essentially free, or completely free of a colorant such as a pigment. The term "substantially free of a colorant" means that the coating composition contains less than 1000 parts per million by weight (ppm) of a colorant based on the total solids weight of the composition, "essentially free of a colorant" means that the coating composition contains less than 100 ppm of a colorant based on the total solids weight of the composition, and "completely free of a colorant" means that the coating composition contains less than 20 parts per billion by weight (ppb) of a colorant based on the total solids weight of the composition.

Other non-limiting examples of components that can be used with the powder coating compositions of the present invention include plasticizers, abrasion resistant particles, anti-oxidants, hindered amine light stabilizers, UV light absorbers and stabilizers, surfactants, flow and surface control agents, thixotropic agents, catalysts, reaction inhibitors, corrosion-inhibitors, and other customary auxiliaries. The powder coating compositions can also be substantially free, essentially free, or completely free of any one of the previously described additional components.

The powder coating composition may be substantially free, essentially free, or completely free of silicone. As used herein, a powder coating composition is substantially free of silicone if silicone is present, if at all, in an amount of less than 5% by weight, based on the total weight of the powder coating composition. As used herein, a powder coating composition is essentially free of silicone if silicone is present, if at all, in an amount of less than 1% by weight, based on the total weight of the powder coating composition.

The powder coating composition may be substantially free, essentially free, or completely free of bentonite. As used herein, a powder coating composition is substantially free of bentonite if bentonite is present, if at all, in an amount of less than 0.5% by weight, based on the total weight of the powder coating composition. As used herein, a powder coating composition is essentially free of bentonite if bentonite is present, if at all, in an amount of less than 0.1% by weight, based on the total weight of the powder coating composition.

The powder coating composition may be substantially free, essentially free, or completely free of titanium dioxide. As used herein, a powder coating composition is substantially free of titanium dioxide if titanium dioxide is present, if at all, in an amount of less than 1% by weight, based on the total weight of the powder coating composition. As used herein, a powder coating composition is essentially free of titanium dioxide if titanium dioxide is present, if at all, in an amount of less than 0.1% by weight, based on the total weight of the powder coating composition.

The powder coating composition may be substantially free, essentially free, or completely free of polyol having a melting point of 40 to 110° C. Examples include a polyether polyol, a polyester polyol, a polycarbonate polyol, an acryl polyol, a polycaprolactone polyol, a linear polyol, and a polysiloxane polyol, all of which have a melting point of 40 to 110° C. As used herein, a powder coating composition is substantially free of polyol having a melting point of 40 to 110° C. if polyol having a melting point of 40 to 110° C. is present, if at all, in an amount of less than 5% by weight, based on the total weight of the powder coating composition. As used herein, a powder coating composition is essentially free of polyol having a melting point of 40 to 110° C. if polyol having a melting point of 40 to 110° C. is present, if at all, in an amount of less than 1% by weight, based on the total weight of the powder coating composition.

After being applied over the substrate to which the first material is applied, the powder coating composition can be physisorbed onto the substrate. As used herein, "physisorbed", "physisorption", and like terms refers to a physical adsorption of a composition or material over the substrate in which the forces involved are intermolecular forces. Alternatively, the powder coating composition can be chemisorbed onto the substrate. As used herein, "chemisorbed", "chemisorption", and like terms refers to a chemical adsorption of a composition or material over the substrate in which chemical or ionic bonds are formed.

As indicated, the first material can be selected to interact with the powder coating composition. As used herein, the term "interact" and variants thereof refer to the ability of the first material to effect or influence any aspect of the powder coating composition including, for example, its cure, physical/chemical properties, performance, appearance, and the like. In accordance with the present invention, the first material is selected from a catalyst that catalyzes cure of the powder coating composition, a component that is reactive with at least one component of the powder coating composition, and/or a rheology modifier that affects the flow of the liquidized powder coating composition over the substrate. The first material may comprise any combination of the first materials selected to interact with the powder coating composition.

As used herein, a "catalyst" refers to a material that increases the rate of reaction of one or more reactive components. Thus, the first material can comprise a catalyst that increases the rate of reaction of the film-forming resin(s) and optional crosslinker(s) that form a binder to thereby catalyze cure of the powder coating composition. The catalyst used as all or part of the first material can therefore be selected based on the components used in the powder coating composition. For example, the binder of the powder coating composition can comprise a carboxylic acid functional compound and an epoxy functional compound reactive with the carboxylic acid functional compound, and the first material can comprise a catalyst comprising a phosphonium compound, a quaternary ammonium halide compound, an amine compound, an imidazole compound, a sulfonium compound, a compound comprising a transition metal and/or post-transition metal, or any combination thereof that increases the reaction rate between the acid and epoxy functionality.

A "phosphonium compound" refers to a salt comprising a phosphonium cation. Non-limiting examples of phosphonium compounds include tetrabutylphosphonium hydroxide and tetrabutylphosphonium bromide.

A "quaternary ammonium halide compound" refers a salt comprising a quaternary ammonium cation and a halogen anion. Non-limiting examples of quaternary ammonium halide compounds include dodecyltrimethylammonium chloride, benzyltrimethylammonium chloride, benzyldimethyloctylammonium chloride, and hexadecyltrimethylammonium bromide.

An "amine compound" refers to a compound comprising one or more primary, secondary, and/or tertiary amines. Non-limiting examples of amine compounds include 1,4-diazabicyclo[2.2.2]octane, 1,8-diazabicyclo[5.4.0]undec-7-ene, coco alkyl amine, benzyl dimethyl amine, and 1,1,3,3-tetramethylguanidine.

An "imidazole compound" refers to a compound comprising a substituted heterocyclic imidazole structure. Non-limiting examples of imidazole compounds include 1-methyl imidazole and 2-methyl imidazole.

A "sulfonium compound" refers to a salt comprising a sulfonium cation. A non-limiting example of a sulfonium compound is trimethylsulfonium iodide.

A "compound comprising a transition metal" refers to a compound comprising an element from one of Groups 3-12 (International Union of Pure and Applied Chemistry (IUPAC)) of the periodic table of the chemical elements, and a "compound comprising post-transition metal" refers to a compound comprising a post-transition metal element from one of Groups 13 and 14 (International Union of Pure and Applied Chemistry (IUPAC)) of the periodic table of the chemical elements. Non-limiting examples of compounds comprising a transition metal include non diammonium dihydroxy bis(lactate(2-)-O1,O2) titanate (2-), and zinc octoate. Non-limiting examples of compounds comprising a post-transition metal include stannous 2-ethylhexoate and tin(II) oxalate.

The first material can comprise a component that is reactive with at least one component of the powder coating composition. For example, the first material can comprise a component that is reactive with a film-forming resin(s) and/or crosslinker(s) used in the binder of the powder coating composition. Non-limiting examples of such reactive components include a crosslinker, a resin such as a film-forming resin, a reactive diluent, a monomer, or any combination thereof.

It is appreciated that the functionality and types of crosslinkers, resins, reactive diluents, and monomers used in the first material are selected to react with the functionality of one or more components of the powder coating composition. Non-limiting examples include any of the resins and crosslinkers previously described provided that the resins or crosslinkers are reactive with the functionality of one or more components of the powder coating composition. For example, the powder coating composition can comprise a carboxylic acid functional film-forming resin and a hydroxyl functional or epoxy functional crosslinker, and the first material can comprise a crosslinker or other component reactive with the carboxylic acid, hydroxyl, and/or epoxy functionality such as, for example, an oxazoline functional crosslinker, a polycarbodiimide functional crosslinker, an isocyanate or blocked isocyanate functional crosslinker, an aminoplast crosslinker, an epoxy crosslinker, a beta-hydroxyalkylamide crosslinker, a hydroxyalkylurea crosslinker, glycoluril, or any combination thereof.

As previously described, the first material can comprise a rheology modifier. As used herein, a "rheology modifier" refers to a component that adjusts flow behavior of a composition by increasing the viscosity of the composition it is in contact with. Particularly, the rheology modifier used in the first material may increase the viscosity and adjust the flow of the liquidized powder coating composition over the substrate. Non-limiting examples of rheology modifiers include silica, chemically modified silica (e.g. fumed silica), alumina, chemically modified alumina (e.g. fumed alumina), a hydrophobically modified ethylene-oxide polymer, a rubber latex such as for example styrene-butadiene rubber particles dispersed in an aqueous liquid medium, or any combination thereof.

The first material, such as a catalyst, reactive component, and/or rheology modifier, can be in solid or liquid form. The first material can also be dispersed or dissolved in an aqueous or non-aqueous liquid medium. The dispersions and solutions can comprise additional components including, but not limited to, surfactants and surfactant solubilizers. It is further appreciated that the powder coating composition can also include a catalyst, reactive component such as a crosslinker, and/or rheology modifier that is different than the catalyst, reactive component, and/or rheology modifier of the first material.

As used herein, a "non-aqueous medium" refers to a liquid medium comprising less than 50 weight % water, based on the total weight of the liquid medium. Such non-aqueous liquid mediums can comprise less than 40 weight % water, or less than 30 weight % water, or less than 20 weight % water, or less than 10 weight % water, or less than 5% water, based on the total weight of the liquid medium. The solvents that make up more than 50 weight % of the liquid medium include organic solvents. Non-limiting examples of suitable organic solvents include polar organic solvents e.g. protic organic solvents such as glycols, glycol ether alcohols, alcohols; and ketones, glycol diethers, esters, and diesters. Other non-limiting examples of organic solvents include aromatic and aliphatic hydrocarbons.

In comparison to a non-aqueous liquid medium, an "aqueous medium" is a liquid medium that comprises greater than 50 weight % water, such as at least 60 weight % water, or at least 70 weight % water, or at least 80 weight % water, or at least 90 weight % water, or at least 95 weight % water, based on the total weight of the liquid medium.

When dispersed or dissolved in a liquid medium, the first material comprises at least 0.05 weight %, at least 0.1 weight %, or at least 1 weight %, based on the total weight of the dispersion or solution. The first material can further comprise up to 20 weight %, up to 15 weight %, up to 10 weight %, up to 8 weight %, up to 5 weight %, or up to 3 weight %, based on the total weight of the dispersion or solution. The first material can also comprise an amount within a range, for example, of from 0.05 weight % to 20 weight %, from 0.05 weight % to 10 weight %, from 0.1 weight % to 8 weight %, or from 0.1 weight % to 5 weight %, based on the total weight of the dispersion or solution.

The first material can be applied directly to the substrate without any intermediate layers between the first material and the substrate. For instance, the first material can be applied directly to a metal substrate, before or after the substrate is cleaned and/or treated as further described herein, but before application of any coating layers. The first material may also be applied during cleaning such as a component of the cleaner. The first material can be applied over the entire surface, edges, and corners of the substrate, or the first material can be applied over selected portions of the substrate. For example, the first material can be selectively applied over the edges and corners of the substrate so that the later applied powder coating composition only interacts with the first material over the edges and corners of the substrate. The first material may also form a continuous or semi-continuous/discontinuous (i.e. non-continuous) layer over the substrate, or the first material may be applied over certain spots/areas of the substrate such as the edges and corners of the substrate. As used herein, the area referred to as the "edge" will vary based on the particular substrate but can include, e.g., the outer most lateral face of the substrate.

Once applied, the first material can be physisorbed onto the substrate in which the first material is physically adsorbed over the substrate through intermolecular forces. Alternatively, the first material is chemisorbed onto the substrate in which the first material is chemically adsorbed over the substrate through valence forces or chemical bonding.

The first material can also be incorporated into a pretreatment composition that is applied over the substrate. As used herein, a "pretreatment composition" refers to a composition that reacts with and chemically alters the substrate surface achieving at least one of the following: 1) formation of a protective layer; 2) improved substrate topography or reactivity to enhance coating adhesion; or 3) formation of a protective layer with improved coating adhesion in comparison to the substrate without pretreatment. Non-limiting examples of pretreatment compositions include compositions that comprise iron phosphate, manganese phosphate, zinc phosphate, a rare earth metal, permanganate or manganese, molybdate or molybdenum, zirconium, titanium, halfnium, lanthanides, a silane such as an alkoxysilane, hydrolyzed silanes and silane oligomers and polymers, metal chelates, trivalent chrome (TCP), silicate, phosphonic acids, chromate conversion coating, hydrotalcite, layered double hydroxide, metal oxides, other metals such as Group IV metals, or any combination thereof. Non-limiting examples of organic pretreatments may include chemically modified resins such as phosphatized epoxies, silanized epoxies and amino functional resins. The pretreatment may also include anodizing using, such as for example, sulfuric acid, nitric acid, hydrofluoric acid, tartaric acid, and other anodizing methods. The pretreatment composition can be in the form of a sol-gel, a liquid, or a solid. In some instances, a pretreatment may contain or be sealed using an oligomeric or polymeric solution or suspension. In yet other instances, a pretreatment composition may contain small organic molecules with reactive functionality or those which function as corrosion inhibitors.

When the pretreatment composition is applied to the substrate and cured or dried, a surface region of the pretreatment layer applied to the substrate can have a greater concentration of the first material than a bulk region of the layer applied to the substrate. For example, the surface tension of the first material can be lower than the surface tension of other components of the pretreatment composition. As a result, the first material migrates to the surface of the pretreatment layer (i.e., moves through the bulk region to the surface region) such that a greater concentration of the first material can be found in the surface region, while the remaining amount of the first material is dispersed throughout the bulk region.

As used herein, the "surface region" means the region that is generally parallel to the exposed air-surface of the coated substrate and which has thickness generally extending perpendicularly from the surface of the cured coating beneath the exposed surface. A "bulk region" of the cured composition means the region which extends beneath the surface region and which is generally parallel to the surface of the coated substrate.

The pretreatment composition that includes the first material can comprise at least 0.05 weight %, at least 0.1 weight %, or at least 1 weight % of the first material, based on the total weight of the pretreatment composition. The pretreatment composition can further comprise up to 20 weight %, up to 15 weight %, up to 10 weight %, up to 8 weight %, up to 5 weight %, or up to 3 weight % of the first material, based on the total weight of the pretreatment composition. The pretreatment composition can also comprise an amount within a range, for example, of from 0.05 weight % to 20 weight %, from 0.05 weight % to 15 weight %, from 0.05 weight % to 10 weight %, from 0.1 weight % to 8 weight %, or from 0.1 weight % to 5 weight % of the first material, based on the total weight of the pretreatment composition.

The first material can also be applied over at least a portion of a substrate that has already had a previous pretreatment and/or coating applied. For example, the first material can be applied to a previously deposited pretreatment layer. Non-limiting examples of pretreatment layers include layers formed from any of the previously described pretreatment compositions. The first material can also be applied over a primer layer or another previously applied coating layer.

The first material may be applied in the absence of binder components that react to form a coating layer when cured such as through crosslinking. That is, the first material may be applied to the substrate or a previously applied coating as a non-film forming composition that does not form a separate coating layer. Thus, the first material may not be contained in a coating composition that can be cured to form a coating layer which is separate from the coating layer formed from the powder coating composition applied directly over the substrate to which the first material has been applied. The dry film thickness of any potential resulting film, even if one or more binder components are present, may be less than 2.5 microns, less than 2 microns, less than 1.5 microns, less than 1 micron, or less than 0.5 micron, or less than 0.25 micron, or less than 0.1 micron.

The first material can be applied such that any other optional components applied together with the first material are substantially free, essentially free, or completely free of binder components that react to form a separate coating layer from the powder coating layer when cured. The term "substantially free" as used in this context means the optional components applied with the first material contain less than 1000 parts per million (ppm), "essentially free" means less than 100 ppm, and "completely free" means less than 20 parts per billion (ppb) of binder components that react to form a separate coating layer from the powder coating layer when cured, based on the total weight of all the components. For example, the first material can be applied such that any other optional components combined and applied together with the first material are substantially free, essentially free, or completely free of self-crosslinkable film-forming resins, a film-forming resin and a crosslinker reactive with the film-forming resin, and/or a film-forming resin reactive with the first material. The first material can also be applied such that any other optional components combined and applied together with the first material are substantially free, essentially free, or completely free of any type of a film-forming resin. For instance, the first material can comprise a catalyst, a rheology modifier, and/or a crosslinker as previously described and any other optional components combined and applied together with the first material may be substantially free, essentially free, or completely free of a film-forming resin including any of the previously described film-forming resins.

One method for applying the first material to the substrate comprises dipping the substrate into a solution that contains the first material. The solution can be, for example, a pretreatment bath. As used herein, a "pretreatment bath" refers to a liquid bath containing the first material and that may optionally contain other components typically found in any type of pretreatment bath. Non-limiting examples of pretreatment baths that the first material can be incorporated into include a cleaner bath, a deoxidizer bath, a cleaner-coater bath, a rinse conditioner bath, a pretreatment coating bath, a rinsing bath, a sealing bath, or a deionized water rinsing bath. It will be appreciated that the first material can be added to any commercially available pretreatment product. It will also be appreciated that when spray pretreatments are used, immersion steps may be avoided entirely.

A "cleaner bath" is a bath comprising materials for removing grease, dirt, or other extraneous matter from the substrate. Non-limiting examples of materials for cleaning the substrate include mild or strong alkaline cleaners.

A "deoxidizer bath" is a bath comprising materials for removing an oxide layer found on the surface of the substrate such as acid-based deoxidizers. Non-limiting examples of acid-based deoxidizers include phosphoric acid, citric acid, nitric acid, fluoroboric acid, sulfuric acid, chromic acid, hydrofluoric acid, and ammonium bifluoride.

A "cleaner-coater bath" is a bath comprising materials for both cleaning and coating the substrate in the same stage. The cleaner-coater bath can therefore clean the substrate, for example as with a mild or strong alkaline cleaner, and then coat the substrate, for example with a pretreatment coating as previously described, in a single step. A non-limiting example of a cleaner-coater includes CHEMFOS 51HD, commercially available from PPG.

A "rinse conditioner bath" is a bath comprising activating agents for increasing the number of activation sites on the surface of the substrate for improved reaction with a pretreatment composition in order to enhance the protection of the substrate. A non-limiting example of a rinse conditioner bath is a bath comprising activating agents that increase the number of sites on the surface of the substrate where phosphate crystals form upon application of a phosphate coating.

A "pretreatment coating bath" refers to a bath comprising a composition for forming a protective layer over the surface of the substrate. Non-limiting examples of pretreatment compositions include any of the pretreatment compositions previously described.

A "rinsing bath" is a bath comprising a solution of rinsing agents to remove any residue after application of a cleaner or pretreatment layer such as a phosphate containing pretreatment layer. In some non-limiting examples, a rinsing bath may simply contain city water or de-ionized water.

A "sealing bath" is a bath comprising a solution or dispersion that is capable of affecting a material deposited onto a substrate in such a way as to enhance its physical and/or chemical properties. Sealer compositions generally utilize solubilized metal ions and/or other inorganic materials to enhance the protection (e.g., corrosion protection) of pretreated substrates. Non-limiting examples include CHEMSEAL 59 and CHEMSEAL 100, both which are commercially available from PPG.

A "deionized water rinsing bath" is a bath that comprises deionized water and can be utilized in multiple stages of a pretreatment process such as a final rinsing stage before drying.

Other non-limiting examples of application methods that can be used to apply the first material onto the substrate include: spraying, such as by incorporating the first material into a liquid formulation and using spray equipment; wiping where the first material is contained on and/or in a wipe and manually or automatically wiped; media blasting where the first material is a solid and is blasted onto the substrate's surface; electrostatically applied as a powder such as after being micronized into a powder with a desired particle size; brushing or rolling the first material over the substrate such as by incorporating the first material into a formulation (e.g., liquid or gel) that can be brushed or rolled; vapor deposition; electrodeposition where the formulation is liquid and is electro-coated; or any combination thereof. The first material may also be applied in-mold, during extrusion, during a calendaring, or during other processing of substrate materials.

As previously described, the method for applying the first material to the substrate can comprise dipping the substrate into a solution or dispersion that contains the first material. It is appreciated that the dispersion can be formed by first preparing the first material in solid form, such as a micronized powder, and then dispersing the solid first material into the liquid medium, such as to form a slurry.

The previously described methods of applying the first material can also be used in the absence of binder components as previously described. For example, the previously described baths can be substantially free, essentially free, or completely free of binder components that react to form a separate coating layer from the powder coating layer when cured. The term "substantially free" as used in this context means that the methods such as the baths use or contain less than 1000 parts per million (ppm), "essentially free" means less than 100 ppm, and "completely free" means less than 20 parts per billion (ppb) of binder components that react to form a separate coating layer from the powder coating layer when cured, based on the total weight of the components such as the components that form the baths.

The first material can be deposited onto the substrate by one or more of any of the previously described methods. The first material can also be applied alone or in combination with other treatments or coating processes. For example, the substrate of the present invention can be dipped or submerged into one or more of any of the previously described baths that include the first material during treatment of the substrate. For instance, the first material can be incorporated into: a cleaner bath to apply the first material directly over the surface substrate; a pretreatment coating bath to apply the first material over the substrate together with the pretreatment layer; or a final deionized water rinse to apply the first material over a pretreatment layer. In another non-limiting example, the substrate is sprayed or wiped with a solution that comprises the first material after application of a pretreatment layer or primer layer. In another non-limiting example, the first material may be present in more than one process step.

The substrate can undergo various treatments prior to application of the first material. For instance, the substrate can be alkaline cleaned, deoxidized, mechanically cleaned, ultrasonically cleaned, solvent wiped, roughened, plasma cleaned or etched, exposed to chemical vapor deposition, treated with an adhesion promoter, plated, anodized, annealed, cladded, or any combination thereof prior to application of the first material. The substrate can be treated using any of the previously described methods prior to application of the first material such as by dipping the substrate in a cleaner and/or deoxidizer bath prior to applying the first material. The substrate can also be plated prior to applying the first material. As used herein, "plating" refers to depositing a metal over a surface of the substrate. The substrate may be also be 3D printed.

The substrate according to the present invention can be selected from a wide variety of substrates and combinations thereof. Non-limiting examples of substrates include vehicles including automotive substrates, industrial substrates, marine substrates and components such as ships, vessels, and on-shore and off-shore installations, storage tanks, packaging substrates, aerospace components, batteries and battery components, bus bars, metal wires, copper or aluminum conductors, wood flooring and furniture, fasteners, coiled metals, heat exchangers, vents, an extrusion, roofing, wheels, grates, belts, conveyors, grain or seed silos, wire mesh, bolts or nuts, a screen or grid, HVAC equipment, frames, tanks, cords, wires, apparel, electronic components, including housings and circuit boards, glass , sports equipment, including golf balls, stadiums, buildings, bridges, containers such as a food and beverage containers, and the like.

The substrates, including any of the substrates previously described, can be metallic or non-metallic. Metallic substrates include, but are not limited to, tin, steel, cold rolled steel, hot rolled steel, steel coated with zinc metal, zinc compounds, zinc alloys, electrogalvanized steel, hot-dipped galvanized steel, galvanealed steel, galvalume, steel plated with zinc alloy, stainless steel, zinc-aluminum-magnesium alloy coated steel, zinc-aluminum alloys, aluminum, aluminum alloys, aluminum plated steel, aluminum alloy plated steel, steel coated with a zinc-aluminum alloy, magnesium, magnesium alloys, nickel, nickel plating, bronze, tinplate, clad, titanium, brass, copper, silver, gold, 3-D printed metals, cast or forged metals and alloys, or combinations thereof.

Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, engineering polymers such as poly(etheretherketone) (PEEK), polycarbonate acrylobutadiene styrene (PC/ABS), polyamide, wood, veneer, wood composite, particle board, medium density fiberboard, cement, stone, glass, paper, cardboard, textiles, leather both synthetic and natural, composite substrates such as fiberglass composites or carbon fiber composites, 3-D printed polymers and composites, and the like.

As used herein, "vehicle" or variations thereof include, but are not limited to, civilian, commercial and military aircraft, and/or land vehicles such as airplanes, helicopters, cars, motorcycles, and/or trucks. The shape of the substrate can be in the form of a sheet, plate, bar, rod or any shape desired.

Further, a "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. Packages coated with the composition of the present invention can also include plastic bottles, plastic tubes, laminates and flexible packaging, such as those made from PE, PP, PET and the like.

The coating may be a dielectric coating (i.e., an electrically insulating coating). For example, the coating may have a dielectric strength of at least 1 kV at any of the dry film thicknesses described herein, as measured by a Sefelec Dielectrimeter RMG12AC-DC and in accordance ASTM D 149-09 Hipot test, such as at least 2 kV, such as at least 2.5 kV, such as at least 5 kV, such as at least 7 kV, such as at least 8 kV, such as at least 10 kV, such as at least 12 kV, or higher. For example, the coating may have a dielectric strength of at least 1 kV at a dry film thickness of 38.1 microns or less, as measured by a Sefelec Dielectrimeter RMG12AC-DC and in accordance ASTM D 149-09 Hipot test, such as at least 2 kV, such as at least 2.5 kV, such as at least 5 kV, such as at least 7 kV, such as at least 8 kV, such as at least 10 kV, such as at least 12 kV, or higher.

The coating may be thermally conductive. For example, the coating may have a thermal conductivity of at least 0.3 W/m·K, as measured according to ASTM D7984, such as at least 0.5 W/m·K, such as at least 0.7 W/m·K, such as at least 0.9 W/m·K, such as at least 1.5 W/m·K, or higher.

As discussed above, the substrate may comprise a battery or battery component. The battery may be, for example, an electric vehicle battery, and the battery component may be an electric vehicle battery component. The battery component may comprise, but is not limited thereto, a battery cell, a battery shell, a battery module, a battery pack, a battery box, a battery cell casing, a pack shell, a battery lid and tray, a thermal management system, an inverter, a battery housing, a module housing, a module racking, a battery side plate, a battery cell enclosure, a cooling module, a cooling tube, a cooling fin, a cooling plate, a bus bar, a battery frame, an electrical connection, metal wires, or copper or aluminum conductors or cables, or any part of a stationary energy storage system. The powder coating composition may be applied over any of these substrates to form an electrically insulating coating (i.e., dielectric coating), a thermally conductive coating, or an electrically insulating and thermally conductive coating, as described herein.

The coated substrate may comprise a battery component comprising a thermally conductive, electrically insulating coating comprising, consisting essentially of, or consisting of a binder and a thermally conductive, electrically insulating filler material. The thermally conductive, electrically insulating filler material may comprise, consist essentially of, or consist of aluminum hydroxide in the amounts taught herein. For example, the coated substrate may comprise a battery component comprising a thermally conductive, electrically insulating coating comprising, consisting essentially of, or consisting of a binder and aluminum hydroxide present in an amount of at least 20% by weight, such as at least 40% by weight, such as at least 45% by weight, such as at least 50% by weight, based on the total weight of the thermally conductive, electrically insulating coating.

The coated substrate may comprise a battery component comprising a thermally conductive, electrically insulating coating comprising, consisting essentially of, or consisting of a binder and a thermally conductive, electrically insulating filler material comprising, consisting essentially of, or consisting of dead burned magnesium oxide.

The coated substrate may comprise a battery component comprising a thermally conductive, electrically insulating coating comprising, consisting essentially of, or consisting of a binder, a thermoplastic material, and a thermally conductive, electrically insulating filler material.

The coated substrate may comprise a battery component comprising a thermally conductive, electrically insulating coating comprising, consisting essentially of, or consisting of a binder, and at least two thermally conductive, electrically insulating filler material. The at least two thermally conductive, electrically insulating filler material may comprise, consist essentially of, or consist of at least two of aluminum hydroxide, dead burned magnesium oxide, and boron nitride. The binder may comprise, consist essentially of, or consist of an epoxy resin and/or a polyester resin.

As indicated, the powder coating composition is directly applied to at least a portion of the substrate to which the first material is applied. That is, the powder coating composition is directly applied to at least a portion of the substrate to which the first material has been applied, such that the first material and the powder coating composition are in contact with each other without any intermediate coating layers in between. The powder coating composition can be applied to the substrate to which the first material is applied without any intervening steps such as drying or heating steps. Alternatively, an additional process step(s) can be conducted before applying the powder coating composition including, but not limited to, drying by air and/or heating the first material. For example, the first material can be applied in a final deionized water rinse or in a pretreatment composition and then dried by air or heat before applying the powder coating composition. The first material can also be applied to the substrate followed by a rinsing step.

After application of the powder coating composition, the first material can be localized at the interface or point of contact between the first material and the liquidized powder coating composition. That is, the first material can be in contact with the liquidized powder coating composition but does not migrate into the liquidized powder coating composition. Alternatively, at least a portion of the first material can migrate into at least a portion of the liquidized powder coating composition. For instance, the first material can migrate into a portion of the bulk region of the liquidized powder coating composition.

The powder coating composition can be applied to the substrate to which the first material is applied to form a monocoat. As used herein, a "monocoat" refers to a single coating layer that is free of additional coating layers. Thus, the powder coating composition can be applied directly to a substrate and cured to form a single layer coating, i.e. a monocoat.

The coated substrate of the present invention may further comprise one or more additional coating layers, such as a second coating composition deposited onto at least a portion of the first powder coating composition, to form a multi-layer coating such as by applying a topcoat. When a multi-layer coating is formed, the first powder coating composition can be cured prior to application of additional coating compositions, or one or more of the additional coating compositions and the first powder coating composition can be cured simultaneously. It is appreciated that the second coating composition and/or additional coating compositions can be in solid or liquid form.

The interaction between the powder coating composition and the first material has been found to effect one or more aspects of the powder coating composition. For example, the interaction between the liquidized powder coating composition and the first material may cause a lower interfacial flow of the liquidized powder coating composition in contact with at least a portion of the substrate to which the first material has been applied than the interfacial flow of the same powder composition liquidized under the same conditions that is in contact with an identical substrate with the exception that no first material has been applied or with a portion of the same substrate to which the first material has not been applied. As such, when the powder coating composition comes into contact with the first material that has been applied to the substrate and is liquidized, the flow of the liquidized powder coating composition at the contacting interface with the first material can decrease and is therefore lower as compared to the same liquidized powder coating composition not in contact with the first material. The interaction between the liquidized powder coating composition and the first material may also produce a higher viscosity in the liquidized powder coating composition than the viscosity of the same powder coating composition liquidized under the same conditions that is not in contact with the first material. The viscosity increase of the liquidized powder coating composition can be localized and increase at the interface of the first material, or can extend through all or part of the liquidized powder coating composition.

The decrease in interfacial flow and the increase in viscosity of the liquidized powder coating composition described herein can be demonstrated through various experiments including crosslink density and cure times. For instance, the coatings of the present invention have a higher crosslink density as compared to a coating deposited from the same powder coating composition applied over a substrate that is free of the first material. The first material applied to the substrate therefore decreases the interfacial flow and increases the viscosity of the liquidized powder coating composition to allow better crosslinking.

The crosslink density can be tested with MEK (methyl ethyl ketone) double rubs in which the index finger of a tester holds a double thickness of cheesecloth saturated with MEK at a 45 degree angle to the coated panel surface. Each rub is performed with one stroke away from the tester and one return stroke toward the tester. The rubs are performed with moderate pressure at a rate of about 1 double rub per second and are at least 4" long. The cheesecloths are remoistened with MEK every 25 to 50 rubs to ensure the applicator remains wet throughout the test. The double rubs are performed until failure of the coating where the coating is removed from the panel.

The degree of crosslinking is also demonstrated by other methods including, but not limited to, solvent soaking and thermomechanical analysis. In the solvent soaking test, coated substrates are soaked in a solvent such as acetone, for example for 24 hours. The coating thickness after solvent soaking is then compared to the coating thickness prior to solvent soaking. The greater the coating thickness retention after solvent soaking, the greater the degree of crosslinking. The coating thickness before and after solvent soaking is measured using 3D digital Macroscope.

For thermomechanical analysis, a Q400 thermomechanical analyzer from TA Instruments Inc. is utilized to investigate the crosslinked structure by monitoring temperature-driven penetration behavior. During such testing, a constant ramp of 10° C./min with a fixed force of 0.1 N can be applied in the temperature range of 25° C.-150° C. with the force being maintained until the system cooled down below 25° C. A full penetration of the entire coating demonstrates a lower crosslinking degree as compared to partial penetration or two step partial penetration behavior.

The interaction with the first material may also cause a higher crosslink density at the interface where the powder coating composition contacted the first material. For example, the coating formed from the powder coating composition can have a higher crosslink density at a lower portion where the powder coating composition contacted the first material such that the crosslink density is lower/decreases at a higher portion of the coating above the lower portion that contacted the first material.

As indicated, the decrease in interfacial flow and the increase in viscosity of the liquidized powder coating composition can also be shown by testing the cure times that the first material provides as compared to the cure times of the powder coating composition without the first material. For instance, it was found that the first material provides a significantly faster gel time when heated with the components of the powder coating composition as compared to the gel time of the powder coating composition that is free of the first material.

After applying the powder coating composition onto the substrate to which the first material has been applied, at least a portion of the powder coating composition can have high pill flow rate while also exhibiting good edge coverage and coating appearance as described herein. For instance, at least a portion of the powder coating composition can have a pill flow rate of greater than 30 mm while also exhibiting good edge coverage and coating appearance. The pill flow rate, as reported herein, is measured according to ASTM D3451-06 (2017) and ISO 8130-11, in which a 65° inclined plane frame was used to hold a 20 inch by 12 inch glass plate. The glass plate and frame are heated to 300° F. for 20 minutes before pellets are dropped on the horizontal plate and allowed to sit one minute before tilting to a 45° angle. The coated plate is then allowed to sit in the oven for 15 minutes before pulling the glass plate and frame out of the oven and cooling. Flow is measured from the top to bottom and reported as millimeters of pill flow. This test is referred to herein as the "pill flow test".

As a result of the interaction between the first material and the powder coating composition, reduced bare metal exposed area on edges as well as improved coating coverage over the edges and corners of the substrate has been observed. This may occur, for example, from a lower interfacial flow at an interface of the first material and the liquidized powder coating composition, as well as from a higher viscosity of at least a portion of the liquidized powder coating composition. For instance, the coated substrates of the present invention may have greater dry film thicknesses at the edges as compared to dry film thicknesses at the edges of substrates coated with the same composition but without the first material. The coated substrates of the present invention, for example, may have a dry film thickness at an edge of the substrate of 2 μm or greater, or 5 μm or greater, or 8 μm or greater, or 10 μm or greater, or 12 μm or greater. The coated substrates of the present invention may have a dry film thickness at an edge of the substrate of up to 25 μm, or up to 20 μm, or up to 15 μm. The coated substrates of the present invention may have a dry film thickness at an edge of the substrate within a range, such as for example, from 2 μm to 25 μm, or from 5 μm to 20 μm, or from 8 μm to 20

The coated substrates of the present invention may have a more consistent or uniform dry film thickness across the surface of the substrate as compared to substrates coated with the same composition but without the first material. That is, the dry film thicknesses at the edges of the coated substrates of the present invention may be more consistent with the dry film thickness at other portions of the substrate toward the center of the substrates, which are historically easier to coat as compared to the edges. For example, the coated substrate of the present invention may have a ratio of a dry film thickness at an edge of the substrate to a dry film thickness 10 mm away from the edge toward the center of the substrate within a range of from 1:3 to 1:15, or from 1:3 to 1:10, or from 1:4 to 1:12, or from 1:4 to 1:8.

The coated substrate of the present invention may have improved corrosion resistance due to improved coating coverage over the edges and corners of the substrate. Particularly, it was found that the coated substrates of the present invention may exhibit less than or equal to 10% linear edge corrosion after 20 or 40 cycles according to SAE J2334. During this corrosion testing, the coated substrates are cleaned, dried, and held against a template with 3 mm wide blocks after exposure. The percent (%) linear edge corrosion of the coated substrate is then determined by counting the number of marked square blocks on the substrate edges that exhibit corrosion products, blisters, and adhesion failure. The percent defects are calculated by taking the total number of squares with defects divided by the total number of squares from the evaluated edges. Good edge coverage is demonstrated with an average value of 3 test substrates below 20% linear edge corrosion, and excellent edge coverage is demonstrated with an average value of 5% or less linear edge corrosion. This linear edge corrosion testing is referred to herein as the "linear edge corrosion test".

The coated substrate of the present invention may also have improved filiform corrosion resistance. Particularly, it was found that the coated substrates of the present invention may provide improved filiform corrosion resistance (tested in accordance with SAE J2635 "Filiform Corrosion Test Procedure for Painted Aluminum Wheels and Painted Aluminum Wheel Trim"), as compared to coated substrates not treated with the first material.

The coated substrate of the present invention may also have improved scribe corrosion resistance. Particularly, it was found that the coated substrates of the present invention may provide improved corrosion resistance when tested in accordance with ASTM-B117-18 and by applying a scribe down the middle of the substrate before measuring the total scribe creep, as compared to coated substrates not treated with the first material.

As indicted, the coated substrates may have good coating appearance. Particularly, the coated substrates of the present invention may have an R-value, which can be used to measure coating appearance, that is close to or the same as an R-value obtained from a substrate coated with the same composition but without the first material. For example, the coated substrates of the present invention have been found to have R-values of 75% or greater, or 80% or greater, or 85% or greater, or 90% or greater, or 95% or greater, or 100%, of an R-value of a substrate coated with the same composition but without the first material.

The R-values of the coated substrates, as reported herein, are determined by first measuring the longwaves and short-waves of the coating substrate using a YK Wavescan Plus available from BYK-Gardner USA, which measures surface topography via an optical profile. The wave scan instrument uses a point source (i.e. laser) to illuminate the surface over a predetermined distance, for example 10 centimeters, at an angle of incidence of 60°. The reflected light is measured at the same, but opposite angle. As the light beam hits a "peak" or "valley" of the surface, a maximum signal is detected; when the beam hits a "slope" of a peak/valley a minimum signal is registered. The measured signal frequency is equal to double spatial frequency of the coating surface topography. Data are divided into longwave (structure size >0.6 mm) and shortwave (structure size <0.6 mm) signals using a mathematical filter function. The R-value is then determined within a scale of 0-10.5, with 10.5 signifying the best appearance. The calculation for R-Value is as follows: $R=10.5-4*\log(a-0.02*|b-20|)$, where $a=20*(10^{\wedge}(\text{Long-wave}/67)-1)$ and $b=20*(10^{\wedge}(\text{Shortwave}/67)-1)$. If R>10.5, then R=10.5. If |b-20|>40, then |b-20|=40. This appearance testing is referred to herein as the "R-value test".

Substrates coated according to the present invention may have one or more improved properties and/or may address one or more issues known in the coating industry. This may include, for example: improved coating edge coverage; more uniform coverage across the entire surface of a substrate including the edges and/or corners; improved sealing over the entire surface of a substrate including the edges and/or corners; increased sag resistance; improved adhesion; and/or improved chip resistance such as resistance during shipping and storing of the coated substrate. As used herein, "sag" refers to as the undesirable flow of the coating on vertical or near-vertical surfaces that produce films of unequal thickness. "Sag resistance" therefore refers to the resistance of the coating to flow on vertical or near-vertical surfaces.

It is appreciated that a substrate comprising the first material allows for the application of various types of coating layers with improved properties including, but not limited to, a multi-layer coating where at least two of the coating layers are formed from powder coating compositions that have the same or different pill flow rates. For example, a multi-layer coating can be formed over the substrate comprising the first material in which the multi-layer coating is obtained from at least two powder coating compositions that both have a pill flow rate over 40, a pill flow rate below 40, or where one composition (the first or second composition) has a pill flow rate above 40 and the other composition (the first or second composition) has a pill flow rate below 40. A non-limiting example of such a multi-layer coating includes a first coating layer formed from a powder composition with low amounts of rheology modifier and a pill flow rate over 40, or over 50, that is applied onto the treated substrate, followed by a powder coating layer formed from a second powder composition with a pill flow rate over 40, or over 50, and which can provide improved film build at the edges of the substrate in the cured multi-layer coating.

The coating composition applied over the substrate comprising the first material can also be selected based on the properties the resulting coating provides. For example, the powder coating composition can be selected to form a dielectric coating over the treated substrate. A "dielectric coating" refers to a coating that is electrically insulating. Powder coating compositions for preparing dielectric coatings can comprise, for example, any of the components previously described provided that the coating is electrically insulating.

The present invention also relates to methods including, for example, methods for treating a substrate, sealing at least a portion of a surface of a substrate, decreasing sag resistance, and/or improving edge coverage comprising: contacting at least a portion of the substrate with the first material; directly contacting at least a portion of the substrate in contact with the first material with a powder coating composition comprising a film-forming resin, an electrically insulative filler, and optionally a crosslinker reactive with the film-forming resin; and liquidizing the powder coating composition to form a coating layer of the powder coating composition on the substrate. The methods of the present invention cause the powder coating composition to come into contact with the first material. The resulting interaction between the liquidized powder coating composition and the first material provided by the method of the present invention effects one or more aspects of the coating composition as previously described including, for example, a lower interfacial flow of the liquidized powder coating composition and/or a higher viscosity of the liquidized powder coating composition as compared to the interfacial flow or viscosity of the same powder composition liquidized under the same conditions that is in contact with an identical substrate with the exception that no first material has been applied or with a portion of the same substrate to which the first material has not been applied.

The first material and powder coating composition used in the methods of the present invention include any of the first materials and powder coating compositions previously described. The first material can also be applied to the substrate, such as directly to the substrate without any intermediate layers, using any of the previously described methods including, for example, dipping, rinsing, wiping, spraying, vapor or electrodepositing, brushing, rolling, or blasting.

The methods of the present invention can also include any of the additional steps described herein. For example, the methods of the present invention can also comprise: treating, plating, and/or applying a pretreatment composition to the substrate before applying the first material; drying the substrate after applying the first material by air and/or heat; and/or applying one or more additional coating compositions.

The substrates coated according to the methods of the invention may include any of the previously described substrates and materials. Different steps can be used to coat certain substrates and materials for particular end uses and applications. For example, a coil can be coated by: contacting at least a portion of the coil with the first material; rolling the coil for storage and/or shipping; unrolling the coil at later period of time; directly contacting at least a portion of the coil in contact with the first material with a powder coating composition comprising a film-forming resin, an electrically insulative filler, and optionally a crosslinker reactive with the film-forming resin; and liquidizing the powder coating composition to form a coating layer of the powder coating composition on the coil. The coil can also be stamped or formed before or after applying the powder coating composition.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

The following examples are presented to demonstrate the general principles of the invention. The invention should not be considered as limited to the specific examples presented. All parts and percentages in the examples are by weight unless otherwise indicated.

EXAMPLES

Example 1

Preparation and Application of Modified Water Rinse to Substrate

Deionized water rinses containing a crosslinker was first prepared by mixing the components listed in Table 1 at room temperature.

TABLE 1

| Component | Ex. 1 (grams) |
| --- | --- |
| Hydromax ® 300 [1] | 1.25 |
| TRITON CF-10 [2] | 0.07 |
| Deionized water | 92.44 |
| CARBODILITE EO5[3] | 0 |

[1] A hydrotrope, nonionic surfactant solubilizer, and electrostatic agent, commercially available from Alfa Chemicals.
[2] A nonionic surfactant, commercially available from DOW.
[3] A polycarbodiimide crosslinking agent, commercially available from Nisshinbo Chemical Inc.

Bare cold rolled steel panels, 4×12×0.32 inch available from ACT item #10161 were first cleaned with MEK solvent, then iron phosphate pretreated with Chemfos® 51HD (a cleaner-coater designed to remove soils and deposit a phosphate coating, commercially available from PPG) solution at 140° F. for 2.5 minutes. Each of the panels were next rinsed with deionized water. The panels were then dipped into the deionized water rinse of Example 1 for 10-15 seconds. All panels were dried in an oven for 2.5 minutes at 375° F. (190.6° C.) and allowed to cool to room temperature.

Example 2

Preparation and Application of a Solution Containing Catalyst to Substrate

A deionized water rinse containing a catalyst was first prepared from the components listed in Table 2.

TABLE 2

| Components | Example 2 (grams) |
|---|---|
| Deionized water | 96.69 |
| Tetrabutyl phosphonium bromide | 2 |
| TRITON CF-10 [1] | 0.07 |
| Hydromax ® 300 [2] | 1.25 |

Bare cold rolled steel panels, 4×12×0.32 inch available from ACT item #10161 were first cleaned with MEK solvent, then iron phosphate pretreated with Chemfos® 51HD (a cleaner-coater designed to remove soils and deposit a phosphate coating, commercially available from PPG) solution at 140° F. for 2.5 minutes. Each of the panels were next rinsed with deionized water. The panels were then dipped into the deionized water rinse of Example 2 for 10-15 seconds. The panels were dried in an oven for 2.5 minutes at 375° F. (190.6° C.) and allowed to cool to room temperature.

Comparative Example 3

Preparation of Comparative Substrate

A control panel (Comparative Example 3) was also prepared by dipping the panel into a Chemfos® 51HD solution at 140° F. for 2.5 minutes, and then rinsing with deionized water. The panel was dried in an oven for 2 minutes at 375° F. (190.6° C.) and allowed to cool to room temperature.

Example 4

Preparation of a Powder Coating Composition

A curable powder coating composition was prepared from the components listed in Table 3.

TABLE 3

| Component | Ex. 4 (gram) |
|---|---|
| Polyester Resin[1] | 229.7 |
| Epoxy Resin[2] | 224.2 |
| Acrylic Resin[3] | 11.1 |
| Tin Catalyst[4] | 0.6 |
| Flow Additive[5] | 4.4 |
| Flow Additive[6] | 5.0 |
| Degassing Additive[7] | 2.2 |
| Blocked Isocycanate[8] | 22.2 |

[1]Carboxyl-functional polyester with acid value of 69.
[2]NPES-903, commercially available from Nan Ya Plastics Corp.
[3]Joncryl ® 819, commercially available from BASF.
[4]Butaflow BT-71, commercially available from Estron Chemical.
[5]Acrylic/silica flow and leveling control agent, commercially available from Estron Chemical Inc.
[6]Micromide 520L, finely micronized EBS wax, commercially available from Micro Powders, Inc.
[7]Benzoin, commercially available from Mitsubishi Chemical Corporation.
[8]VESTAGON ® BF 1540, uretdione blocked isocyanate adduct, commercially available from Evonik.

Each of the components listed in Table 1 were weighed in a container and mixed in a prism high speed mixer for 30 seconds at 3500 RPM to form dry homogeneous mixtures. The mixtures were then melt mixed in a Werner Pfleiderer 19 mm twin screw extruder with an aggressive screw configuration and a speed of 500 RPM. The first zone was set at 50° C., and the second, third, and fourth zones were set at 110° C. The feed rate was such that a torque of 50-60% was observed on the equipment. The mixtures were dropped onto a set of chill rolls to cool and re-solidify the mixtures into solid chips. The chips were ground in a Mikro ACM®-1 Air Classifying Mill to obtain a particle size of 5 to 150 microns with a majority of the particles being from 20 to 40 microns. The resulting coating compositions were solid particulate powder coating compositions that were free flowing.

Examples 5 and 6

Preparation of a Powder Coating Composition

Curable powder coating compositions was prepared from the components listed in Table 4:

TABLE 4

| Component | Ex. 5 | Ex. 6 |
|---|---|---|
| EPON 2004[1] | 305.32 | 249.13 |
| NPES-903 EPOXY RESIN[2] | 305.32 | 249.13 |
| EPIKURE P-202[3] | 128.34 | 104.72 |
| RESIFLOW PL-200A[4] | 10.00 | 10.00 |
| BENZOIN[5] | 5.00 | 5.00 |
| LUNAMER MB-68[6] | 2.00 | |
| PHENOXY RESIN BLEND[7] | 20.00 | 100.00 |
| PRINTEX G[8] | 6.00 | 6.00 |
| PORTAFILL A 40[9] | 216.52 | 272.51 |
| AEROX. ALU C/SPECTR.[10] | 1.50 | 1.50 |

[1]Epoxy resin commercially available epoxy resin from Hexion Specialty Chemicals
[2]Commercially available epoxy resin from Nan Ya
[3]Commercially available phenolic curative from Flexion Specialty Chemicals
[4]Commercially available flow control agent from Estron Chemical
[5]Commercially available degassing agent from Mitsubishi Chemical Corporation
[6]Commercially available salt of polycarboxylic acid with cyclic amidine form Aal Chem
[7]Commercially available PKHB-XLV phenoxy resin from Gabriel Performance Products
[8]Commercially available carbon black pigment from Orion Engineered Carbons
[9]Aluminum hydroxide (ATH) having a $D_{97}$ particle size of about 36 commercially available from Sibelco
[10]Commercially available aluminum oxide from Evonik Industries With the exception of the AEROX. ALU C/SPECTR, each of the components listed in TABLE 4 were weighed in a container and mixed in a Henschel high speed mixer for 30 to 90 seconds at 1500 RPM to form a dry homogeneous mixture. The mixture was then melt mixed in a Werner & Pfleiderer 30 mm twin screw extruder with a speed of 425 RPM. The extruder zones were set at 110° C. The feed rate was such that a torque of 25% was observed on the equipment. The mixture was dropped onto a set of chill rolls to cool and re-solidify the mixtures into solid chips. The addition of the AEROX. ALU C/SPECTR was incorporated with the cooled chips. The chips were milled in a Bantam Mill to obtain a particle size of predominantly 5 to 100 microns with a majority of the particles being from 15 to 80 microns by volume. The resulting coating composition was a solid particulate powder coating composition that was free flowing.

Example 6

Preparation and Evaluation of Coated Substrates

Three substrates of each of Examples 1 and 2 and Comparative Example 3 were electrostatically sprayed with the powder coating composition of Example 4, Example 5, or Example 6 using a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 5 microns. The powder coatings were heated in an electric oven (Despatch LAD series electric oven) for 20 minutes at 375° F. to cure and form the coatings.

The average edge coverage of each coated substrate was tested. The edge coverage was tested using FE-SEM Analysis. For the edge coverage test, small square sections were cut from an area of each panel with a panel cutter and mounted in epoxy overnight. After curing, the mounts were ground, polished, and placed on aluminum stubs with carbon tape. Samples were then coated with Au/Pd for 20 seconds and analyzed in a Quanta 250 FEG SEM under high vacuum. The accelerating voltage was set to 20.00 kV and the spot size was 3.0. The samples were viewed in both secondary and back-scatter mode depending on which image allowed the best contrast. Three dry film thickness measurements were collected from around the front, middle, and back panel edges and averaged to provide average edge coverage measurements for each area. The measurements were taken at the thinnest part of the coating at the edge of the substrate.

The test results of the average edge coverage for substrates coated with the powder coating composition of Example 4 are provided in Table 5 below.

TABLE 5

| Example (rinse) | Average edge coverage top (microns) | Average edge coverage middle (microns) | Average edge coverage bottom (microns) | Average edge coverage across top, middle and bottom (microns) |
|---|---|---|---|---|
| Example 1 (TBPBr) | 5.68 | 4.52 | 1.67 | 4.0 |
| Example 2 (crosslinker) | 6.35 | 8.12 | 3.95 | 6.1 |
| Comparative Ex. 3 | 1.67 | 2.38 | 1.89 | 2.0 |

As shown in Table 5, the portions of the coated substrates treated with the different methods all exhibited improved edge coverage as compared to the comparative example that did not include either of the treatments prior to applying the powder coating.

The test results of the average edge coverage for substrates coated with the powder coating composition of Example 5 or Example 6 are provided in Table 6 below.

TALBE 6

| Example Substrates (rinse) | Example 5 Average edge coverage (microns) | Example 6 Average edge coverage (microns) |
|---|---|---|
| Example 1 (TBPBr) | 1.7 | 5.5 |
| Example 2 (crosslinker) | 2.5 | 5.4 |
| Comparative Ex. 3 | 0.0 | 0.0 |

As shown in Table 6, the portions of the coated substrates treated with the different methods all exhibited improved edge coverage as compared to the comparative example that did not include either of the treatments prior to applying the powder coating.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

What is claimed is:

1. A substrate comprising:
   (a) a first material applied to at least a portion of the substrate; and
   (b) a continuous film deposited from a curable powder coating composition comprising a film-forming resin having functional groups, a thermally conductive, electrically insulative filler material, and optionally a crosslinker that is reactive with the functional groups of the film-forming resin, in contact with at least a portion of the substrate to which the first material has been applied, wherein the first material is (i) a catalyst that catalyzes cure of the powder coating composition, (ii) a component reactive with the film-forming resin and/or the crosslinker of the powder coating composition, and/or (iii) a rheology modifier; and wherein the thermally conductive, electrically insulative filler material has a reported average particle size in at least one dimension of 0.01 microns to 500 microns as reported by the manufacturer.

2. The substrate of claim 1, wherein the thermally conductive, electrically insulative filler material comprises boron nitride, silicon nitride, aluminum nitride, boron arsenide, aluminum oxide, magnesium oxide, dead burn magnesium oxide, beryllium oxide, silicon dioxide, zinc oxide, nickel oxide, copper oxide, tin oxide, aluminum hydroxide, magnesium hydroxide, boron arsenide, silicon carbide, agate, emery, ceramic microspheres, diamond, or any combination thereof.

3. The substrate of claim 1, wherein the thermally conductive, electrically insulative filler material comprises aluminum hydroxide.

4. The substrate of claim 1, wherein the thermally conductive, electrically insulative filler material comprises dead burned magnesium oxide.

5. The substrate of claim 1, wherein the thermally conductive, electrically insulative filler material comprises at least two of aluminum hydroxide, dead burned magnesium oxide, and boron nitride.

6. The substrate of claim 1, wherein the thermally conductive, electrically insulative filler material has a thermal conductivity of 5 W/m·K to 3,000 W/m·K at 25° C. (measured according to ASTM D7984), and the thermally conductive, electrically insulative filler material has a volume resistivity of at least 10 Ω·m (measured according to ASTM D257, C611, or B193).

7. The substrate of claim 1, wherein the continuous film deposited from the curable powder coating composition further comprises a thermally conductive, electrically conductive filler material.

8. The substrate of claim 1, wherein the continuous film deposited from the curable powder coating composition further comprises a non-thermally conductive, electrically insulative filler.

9. The substrate of claim 1, wherein the thermally conductive, electrically insulative filler material comprises a regular or irregular shape and is spherical, ellipsoidal, cubical, platy, acicular (elongated or fibrous), rod-shaped, disk-shaped, prism-shaped, flake-shaped, rock-like, agglomerates thereof, or any combination thereof.

10. The substrate of claim 1, wherein the continuous film further comprises a thermoplastic material and/or a core-shell polymer.

11. The substrate of claim 1, wherein the continuous film further comprises a dispersant.

12. The substrate of claim 1, wherein the powder coating composition is substantially free of titanium dioxide.

13. The substrate of claim 1, wherein the continuous film has a dielectric strength of at least 1 kV at a dry film thickness of 38.1 microns or less, as measured by a Sefelec Dielectrimeter RMG12AC-DC and in accordance ASTM D 149-09 Hipot test.

14. The substrate of claim 1, wherein the continuous film has a thermal conductivity of at least 0.3 W/m·K, as measured according to ASTM D7984.

15. The substrate of claim 1, wherein the continuous film comprises a binder comprising: (a) an epoxy functional polymer;

(b) a poly-carboxylic acid functional polyester polymer reactive with the epoxy functional polymer and which comprises an acid value of less than 100 mg KOH/g; and (c) a poly-carboxylic acid functional (meth) acrylate polymer reactive with the epoxy functional polymer.

16. The substrate of claim 1, wherein the first material is the catalyst that catalyzes cure of the powder coating composition.

17. The substrate of claim 1, wherein the first material is the component reactive with the film-forming resin and/or the crosslinker of the powder coating composition.

18. The substrate of claim 1, wherein the first material comprises a polycarbodiimide crosslinker.

19. The substrate of claim 1, wherein the first material is the rheology modifier.

20. The substrate of claim 1, wherein the first material is included in a pretreatment composition applied to at least a portion of the substrate.

21. The substrate of claim 1, wherein the substrate further comprises a pretreatment layer and the first material is applied over at least a portion of the pretreatment layer.

22. The substrate of claim 1, wherein the substrate further comprises a coating layer and the first material is applied over at least a portion of the coating layer.

23. The substrate of claim 1, further comprising a second coating composition applied over at least a portion of the continuous coating formed from the powder coating composition of (b).

24. The substrate of claim 1, wherein the substrate is a metal.

25. The substrate of claim 1, wherein the substrate comprises a battery cell, a battery shell, a battery module, a battery pack, a battery box, a battery cell casing, a pack shell, a battery lid and tray, a thermal management system, a battery housing, a module housing, a module racking, a battery side plate, a battery cell enclosure, a cooling module, a cooling tube, a cooling fin, a cooling plate, a bus bar, a battery frame, an electrical connection, metal wires, or copper or aluminum conductors or cables, or any combination thereof.

*     *     *     *     *